United States Patent [19]
Rink et al.

[11] Patent Number: 5,941,562
[45] Date of Patent: Aug. 24, 1999

[54] ADAPTIVE OUTPUT INFLATOR HAVING A SELECTABLE OXIDANT COMPOSITION

[75] Inventors: Karl K. Rink, Liberty; David J. Green, Brigham City; Walter A. Moore, Ogden; Robert E. Lewis, Roy, all of Utah

[73] Assignee: Autoliv ASP, Ogden, Utah

[21] Appl. No.: 08/935,014

[22] Filed: Sep. 22, 1997

Related U.S. Application Data

[63] Continuation-in-part of application No. 08/632,698, Apr. 15, 1996, Pat. No. 5,669,629.

[51] Int. Cl.$^6$ .................................................. B60R 21/26
[52] U.S. Cl. ........................................... 280/737; 280/741
[58] Field of Search ..................................... 280/737, 741

[56] References Cited

U.S. PATENT DOCUMENTS

| | | |
|---|---|---|
| 651,132 | 6/1900 | Davis . |
| 1,056,560 | 3/1913 | Lippincott . |
| 1,805,721 | 5/1931 | Kogl . |
| 2,334,211 | 11/1943 | Miller . |
| 2,403,932 | 7/1946 | Lawson . |
| 2,995,987 | 8/1961 | Fitzpatrick . |
| 3,664,134 | 5/1972 | Seitz .......................................... 60/274 |
| 3,786,843 | 1/1974 | Stephenson et al. ................... 280/737 |
| 3,862,866 | 1/1975 | Timmerman et al. ..................... 149/21 |
| 3,884,497 | 5/1975 | Massengill et al. . |
| 3,958,949 | 5/1976 | Plantif et al. ............................ 280/741 |
| 3,964,256 | 6/1976 | Plantif et al. ............................ 280/741 |
| 3,986,456 | 10/1976 | Doin et al. ............................... 280/741 |
| 4,050,483 | 9/1977 | Bishop ........................................ 141/4 |
| 5,031,932 | 7/1991 | Frantom et al. ........................ 280/741 |
| 5,060,973 | 10/1991 | Giovanetti . |
| 5,076,607 | 12/1991 | Woods et al. ............................ 280/737 |
| 5,171,385 | 12/1992 | Michels et al. . |
| 5,230,531 | 7/1993 | Hamilton et al. ........................ 280/737 |
| 5,330,730 | 7/1994 | Brede et al. ................................ 149/1 |
| 5,348,344 | 9/1994 | Blumenthal et al. .................... 280/737 |
| 5,351,988 | 10/1994 | Bishop et al. ............................ 280/737 |
| 5,428,988 | 7/1995 | Starkovich .................................. 73/40 |
| 5,452,661 | 9/1995 | Neff ...................................... 102/202.7 |
| 5,464,248 | 11/1995 | Sasaki et al. ............................ 280/741 |
| 5,470,104 | 11/1995 | Smith et al. . |
| 5,494,312 | 2/1996 | Rink . |
| 5,504,288 | 4/1996 | Morin ...................................... 280/736 |
| 5,531,473 | 7/1996 | Rink et al. ............................... 280/737 |
| 5,536,339 | 7/1996 | Verneker ................................. 149/19.5 |
| 5,580,086 | 12/1996 | McAlister ............................... 280/737 |
| 5,582,806 | 12/1996 | Skanberg et al. ....................... 422/305 |
| 5,713,595 | 2/1998 | Mooney et al. ......................... 280/736 |

FOREIGN PATENT DOCUMENTS

| | | |
|---|---|---|
| 0757975 | 2/1997 | European Pat. Off. . |
| 2111442 | 6/1972 | France . |
| 4303169 | 4/1994 | Germany . |

OTHER PUBLICATIONS

Radioflo Theory Training Manual, Jan. 1997 by IsoVac Engineering, Inc., pp. T–1 through T–27.

"Leak Testing Electronic Devices in Production Quantities" by George Neff and Jimmie Neff reprint from Microelectronic Manufacturing and Testing, Sep. 1986.

Patent Abstract of Japan, vol. 005, No. 156 (C–074), Oct. 6, 1981 & JP 56 088804 A (Toshiba Battery Co. Ltd.), Jul. 18, 1981.

"New Branching Ratio for $Kr^{85}$" by Klaus W. Geiger, Janet S. Merritt and John G.V. Taylor, Nucleonics, Jan. 1961.

Isovac Engineering, Inc. History & Background, 2 pages, undated.

*Primary Examiner*—Kenneth R. Rice
*Attorney, Agent, or Firm*—Sally J. Brown

[57] ABSTRACT

An improved adaptive output inflator is provided wherein inflator performance, such as measured by inflator gas output, can be appropriately varied and selected by appropriately varying and selecting the operational oxidant composition of the inflator.

28 Claims, 9 Drawing Sheets

ADAPTIVE OUTPUT INFLATOR HAVING A SELECTABLE OXIDANT COMPOSITION

CROSS REFERENCE TO RELATED APPLICATION

This application is a continuation-in-part application of application, U.S. Ser. No. 08/632,698, filed on Apr. 15, 1996, now U.S. Pat. No. 5,669,629. The co-pending application is hereby incorporated by reference herein and made a part hereof, including but not limited to those portions which specifically appear hereinafter.

BACKGROUND OF THE INVENTION

This invention relates generally to inflatable restraint systems and, more particularly, to an apparatus and method for use in inflating an inflatable device such as an inflatable vehicle occupant restraint of a respective inflatable restraint system. More specifically, the invention relates to an inflator device having an inflation output adaptive to selected operating conditions and parameters and, in particular, to an adaptive output inflator having a selectable oxidant composition.

It is well known to protect a vehicle occupant using a cushion or bag, e.g., an "airbag," that is inflated or expanded with gas when the vehicle encounters sudden deceleration, such as in the event of a collision. In such systems, the airbag is normally housed within the vehicle in an uninflated and folded condition to minimize space requirements. Upon actuation of the system, the airbag begins being inflated in a matter of no more than a few milliseconds with gas produced or supplied by a device commonly referred to as "an inflator."

Many types of inflator devices have been disclosed in the art for the inflation of an airbag such as used in inflatable restraint systems. Prior art inflator devices include compressed stored gas inflators, pyrotechnic inflators and hybrid inflators. Unfortunately, each of these types of inflator devices is typically subject to certain disadvantages.

For example, stored gas inflators typically require the storage of a relatively large volume of gas at relatively high pressures. As a result of high gas storage pressures, the walls of the gas storage chambers of such inflators are typically relatively thick for increased strength. The combination of large volume and thick walls can result in a relatively heavy and bulky inflator design.

With respect to pyrotechnic inflators wherein gas is derived from a combustible gas generating material, i.e., a pyrotechnic, such gas generating materials can typically produce various undesirable combustion products, including various solid particulate materials. The removal of such solid particulate materials, such as by the incorporation of various filtering devices within or about the inflator, undesirably increases inflator design and processing complexity and can increase the costs associated therewith. In addition, the temperature of the gases emitted from such inflator devices can typically vary between about 500° F. (260° C.) and 1200° F. (649° C.), dependent upon numerous interrelated factors including, for example, the desired level of inflator performance, as well as the type and amount of gas generant material used therein. Consequently, airbags used in conjunction with these types of inflator devices are commonly constructed of or coated with materials which are resistant to such high temperatures. For example, an airbag such as constructed of nylon fabric, in order to resist burn through as a result of exposure to such high temperatures, can be prepared such that the nylon fabric airbag material is coated with neoprene or one or more neoprene coated nylon patches are placed at the locations of the airbag at which the hot gas initially impinges. As will be appreciated, such specially fabricated or prepared airbags are typically more costly to manufacture and produce.

Hybrid inflators, wherein airbag inflating gas results from a combination of stored compressed gas and combustion of a pyrotechnic gas generating material, also typically result in a gas having a relatively high particulate content.

Commonly assigned U.S. Pat. No. 5,470,104, Smith et al., issued Nov. 28, 1995; U.S. Pat. No. 5,494,312, Rink, issued Feb. 27, 1996; and U.S. Pat. No. 5,531,473, Rink et al., issued Jul. 2, 1996, disclose the development of a new type of inflator device which utilizes a fuel material in the form of a fluid, e.g., in the form of a gas, liquid, finely divided solid, or one or more combinations thereof. For example, in one such inflator device, the fluid fuel is burned to produce gas which contacts a quantity of stored pressurized gas to produce inflation gas for use in inflating the respective inflatable device.

In addition, various inflatable restraint system arrangements have been proposed wherein the inflation of an airbag is adjusted based on factors such as, for example, the speed of deceleration of the vehicle and seat belt usage by the occupant.

For example, U.S. Pat. No. 5,323,243 discloses an occupant sensing apparatus for use in an occupant restraint system. The disclosed sensing apparatus preferably monitors the passenger seat in the vehicle to detect the presence, position and weight of an object on the seat. A control algorithm is performed to control inflation of the airbag, responsive to the detected values.

U.S. Pat. No. 5,074,583 discloses an airbag system for an automobile including a seating condition sensor that detects a seating condition of a passenger with respect to seat position, reclining angle, as well as passenger size and posture. The invention seeks to operate the airbag system in accordance with the seating condition of the passenger such that the inflated bag is brought into optimal contact with the occupant.

In order to provide two or more performance levels, many adaptive inflation systems (including both pyrotechnic and stored gas-based systems) rely upon the use of two or more fuels or stored gases. These fuels and/or stored gases are often stored or contained separately and may be either of similar or dissimilar compositions. The need to contain or store multiple fuel and/or stored gases typically increases assembly complexity and cost.

Thus, there is a need and demand for inflator devices which reduce or simplify the number or types of gas generating or producing materials required therein and can thus assist in simplifying and reducing the costs and expenses associated with the manufacture and production of the inflator devices.

Still further, many of the above-identified types of prior art inflator devices require or rely on one or more combustion reactions for gas generation or production. Typically, the combustion of a fuel and an oxidant will only occur under certain appropriate conditions. It is often convenient to use the terms "limit of flammability" and "equivalence ratio" when seeking to express the ability of a combination of reactants to undergo a combustion reaction. A mixture of fuel and oxidant, with or without the presence of inert materials such as may serve as diluent, will normally only ignite and burn within a certain range of equivalence ratios. If certain parameters of the mixture are changed in sufficient magnitude, the mixture becomes nonflammable. At given operating conditions, the flammability operation parameter at which there is just insufficient fuel to form a flammable mixture is often referred to as the "lean limit" of flammability. Conversely, the flammability operation parameter at which, for given operating conditions, there is just an excess of fuel to form a flammable mixture is often referred to as the "rich limit" of flammability. Since a stoichiometric combustion reaction ratio can be defined for any fuel and oxidant mixture, the flammability limits for a mixture of fuel and oxidant can be expressed in terms of the equivalence ratio. The equivalence ratios at the flammability limits are referred to as the "critical equivalence ratios."

Typically, the flammability limits for a particular fuel and oxidant mixture are strongly dependent on the pressure and temperature of the mixture. Generally, the rich limit of flammability increases greatly with increasing pressure and temperature. On the other hand, however, the lean limit of flammability decreases relatively only slightly with increasing pressure.

Certain prior art adaptive inflation systems correspond to the combining or joining together of two "single output" inflators. The mounting of two individual inflators with a common diffuser is an example of such a prior art adaptive inflation system. In such an inflation system, the two individual inflators can be pyrotechnic inflators (such as with each inflator individually sized to provide an inflation output for a driver side airbag). Alternatively, such a prior art adaptive inflation system can include compressed gas inflation systems. For example, such an adaptive inflation system can include two fuel combustion chambers which share a common inert gas storage chamber.

Unfortunately, the output levels realized with such adaptive inflation systems are oftentimes not "independent" of each other. That is, such systems are not always able to provide a high level output performance corresponding to the performance level output which would normally be realized if each of the "single output" inflators were operated independently of each other and the respective outputs then appropriately combined to form a single output. While the interaction between output levels realized in such inflation systems is complex, it is believed that the reaction which controls the second level of operation may adversely affect the reaction which controls the first level of output.

In view thereof, adaptive inflation systems which provide, desirably consistent and uniform or discrete, independent levels of operation are desired and sought.

Further, with operation of at least certain of the above-described prior art adaptive inflation systems to provide only the first level of performance, the system components included to create the second (typically higher) level of performance will remain intact or "live," ready to operate. That is, such a partially-operated adaptive output inflation system typically remains partially-active and can pose or create undesired problems and risks. For example, in such a partially-operated adaptive output inflation system the system components included to create the second level of performance function or operate at some later and potentially unspecified point in time, creating a potential danger or risk.

Consequently, adaptive inflation systems which reduce or minimize the potential risks or dangers posed by the partial operation of the system are desired and sought.

While certain prior inflator devices avoid or minimize at least some of the above-identified shortcomings, there remains a need for an inflator device of simple design, construction, and operation and which, as compared to known inflation devices, can better vary output parameters such as the quantity, supply, and rate of supply of inflation gas, dependent on selected operating conditions such as ambient temperature, occupant presence, seat belt usage and rate of deceleration of the motor vehicle, for example.

SUMMARY OF THE INVENTION

A general object of the invention is to provide an improved adaptive output inflator.

A more specific objective of the invention is to overcome one or more of the problems described above.

The general object of the invention can be attained, at least in part, through an adaptive output inflator having a selectable oxidant composition. In one embodiment, such an inflator apparatus includes a first chamber containing nitrous oxide and a heat source actuatable to be in heat transmitting communication with the first chamber to initiate decomposition of the nitrous oxide. In such apparatus, the first chamber is adapted to provide gaseous inflation material to the inflatable device. Thus, the apparatus also includes at least one exit opening wherethrough gaseous inflation material from the first chamber can be expelled from the apparatus. The apparatus further includes first sealing means normally preventing flow of gaseous inflation material through the at least one exit opening, opening means actuatable to open the at least one exit opening whereby at least a portion of gaseous inflation material from the first chamber can be expelled from the apparatus, and directing means for directing the expelled contents of the first chamber to the inflatable device.

The prior art fails to provide an adaptive output inflator of as simple as desired design and construction, such as may result in reduced cost and increased reliability. More specifically, the prior art fails to provide an adaptive output inflator and an associated method of inflator operation in which inflator performance, such as measured by inflator gas output, can be appropriately varied and selected by appropriately varying and selecting the operational oxidant composition of the inflator.

The invention further comprehends an adaptive output inflator apparatus for inflating an inflatable device and which apparatus includes first and second chambers, a heat source, an igniter and directing means.

The first chamber contains nitrous oxide and is adapted to provide gaseous inflation material to the inflatable device, while the second chamber stores a charge of gas generant material. The heat source is actuatable to be in heat transmitting communication with the first chamber to initiate decomposition of the nitrous oxide.

The apparatus also includes at least one exit opening wherethrough gaseous inflation material from the first chamber can be expelled from the apparatus; first sealing means normally preventing flow of gaseous inflation material through the at least one exit opening; and opening means actuatable to open the at least one exit opening whereby at least a portion of gaseous inflation material from the first chamber can be expelled from the apparatus.

The second chamber is openable to the first chamber whereby at least a portion of the charge of gas generant material is placed in fluid communication with the contents of the first chamber and at least a portion of the gas generant is combustible.

The igniter, when actuated, ignites the combustible gas generant to form hot gaseous inflation products to inflate the device, with the directing means directing the expelled contents of the first chamber to the inflatable device The invention still further comprehends certain improvements in an apparatus that forms an inflation material for inflating an inflatable device. For example, the invention specifically comprehends the improvement of the incorporation of a plurality of internal flow throttling orifices with a flow restricting member selectively restricting flow of material through at least one of the internal flow throttling orifices upon actuation of the apparatus.

As used herein, references to "combustion," "combustion reactions" and the like are to be understood to generally refer to the exothermic reaction of a fuel with an oxidant.

References to "decomposition," "decomposition reactions" and the like are to be understood to refer to the splitting, dissociation or fragmentation of a single molecular species into two or more entities.

"Thermal decomposition" is a decomposition controlled primarily by temperature. It will be appreciated that while pressure may, in a complex manner, also influence a thermal decomposition such as perhaps by changing the threshold temperature required for the decomposition reaction to initiate or, for example, at a higher operating pressure change the energy which may be required for the decomposition reaction to be completed, such decomposition reactions remain primarily temperature controlled.

"Exothermic thermal decomposition" is a thermal decomposition which liberates heat.

As identified above, the term "equivalence ratio" ($\phi$) is an expression commonly used in reference to combustion and combustion-related processes. Equivalence ratio is defined as the ratio of the actual fuel to oxidant ratio $(F/O)_A$ divided by the stoichiometric fuel to oxidant ratio $(F/O)_s$:

$$\phi = (F/O)_A / (F/O)_s$$

(A stoichiometric reaction is a unique reaction defined as one in which all the reactants are consumed and converted to products in their most stable form. For example, in the combustion of a hydrocarbon fuel with oxygen, a stoichiometric reaction is one in which the reactants are entirely consumed and converted to products entirely constituting carbon dioxide ($CO_2$) and water vapor ($H_2O$). Conversely, a reaction involving identical reactants is not stoichiometric if any carbon monoxide (CO) is present in the products because CO may react with $O_2$ to form $CO_2$, which is considered a more stable product than CO.)

As described above, for given temperature and pressure conditions, fuel and oxidant mixtures are flammable over only a specific range of equivalence ratios. Mixtures with an equivalence ratio of less than 0.25 are herein considered nonflammable, with the associated reaction being a decomposition reaction, as opposed to a combustion reaction.

References to inflator or inflation gas "output" are to be understood to refer to inflator performance output parameters such as the quantity, supply, and rate of supply of inflation gas. With adaptive output inflators, the inflator output is generally dependent on selected operating conditions such as ambient temperature, occupant presence, seat belt usage and rate of deceleration of the motor vehicle, for example.

Other objects and advantages will be apparent to those skilled in the art from the following detailed description taken in conjunction with the appended claims and drawings.

DETAILED DESCRIPTION OF THE INVENTION

Figure 1:
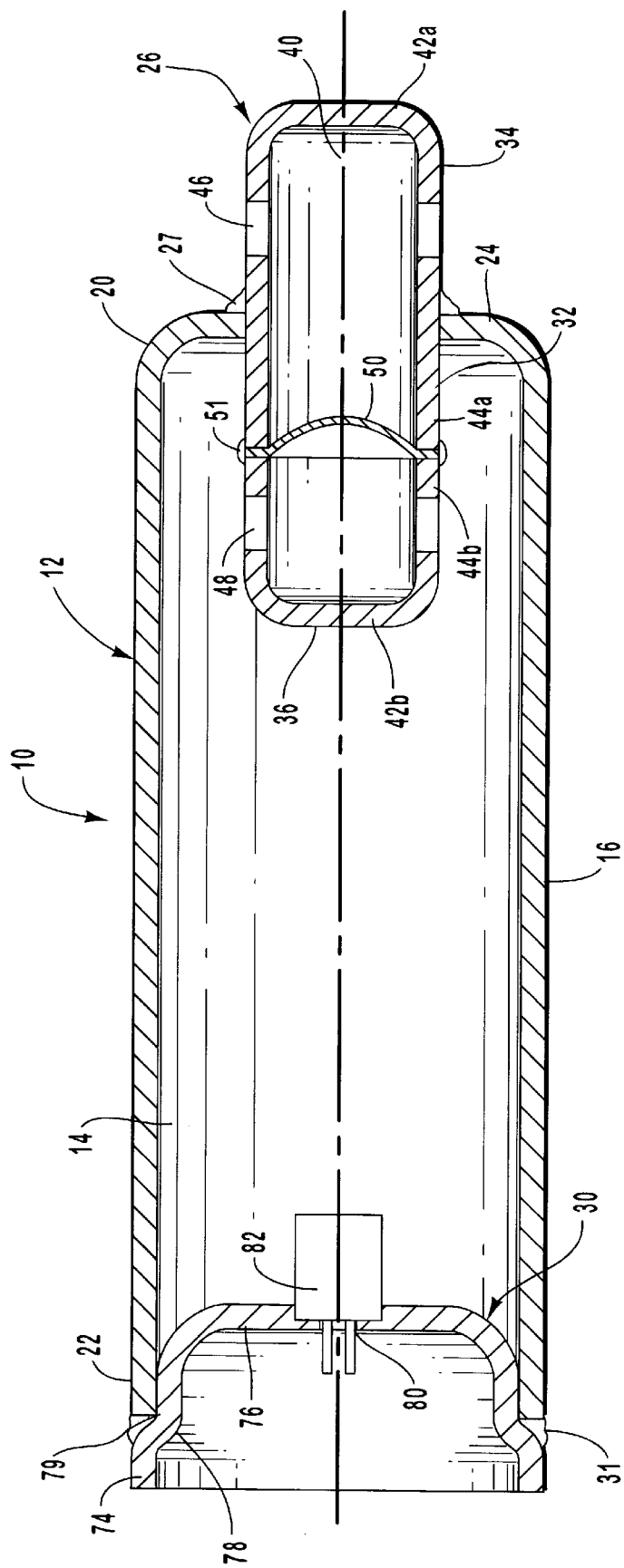
FIG. 1 is a simplified, partially in section, schematic drawing of an airbag inflator which generates inflation gas via a decomposing material, in accordance with one embodiment of the invention.

Referring initially to FIG. 1, there is illustrated an airbag inflator assembly, generally designated by the reference numeral 10. As will be described in greater detail below, the inflator assembly 10 generates inflation gas via a decomposing material. It will be understood that the invention described hereinafter has general applicability to various types or kinds of airbag assemblies including driver side, passenger side, and side impact airbag assemblies for automotive vehicles including vans, pick-up trucks, and particularly automobiles.

The inflator assembly 10 comprises a pressure vessel 12 including a chamber 14 that contains contents including at least one gas source material which undergoes decomposition to form decomposition products including at least one gaseous decomposition product used to inflate an associated inflatable airbag device (not shown). Thus, the chamber 14 is sometimes referred to herein as a "decomposition chamber."

The chamber 14 is defined by an elongated generally cylindrical sleeve 16, having a first end and a second end, 20 and 22, respectively. The first end 20 is partially closed by means of a shoulder portion 24. As shown, the shoulder portion 24 can desirably be integral (i.e., formed continuous with and in one piece) with the sleeve 16.

A diffuser assembly 26 is attached by a circumferential weld 27 in sealing relation to the shoulder portion 24. A decomposition chamber base portion 30 is attached by a circumferential weld 31 in sealing relation to the sleeve second end 22.

The diffuser assembly 26 comprises a generally cylindrical sleeve 32 having a cap portion 34 and a base portion 36 to define a diffuser chamber 40. Each of the diffuser assembly cap and base portions, 34 and 36, respectively, include a closed first end 42a and 42b, respectively, and an open second end 44a and 44b, respectively. The diffuser assembly cap portion 34 includes a plurality of openings 46, adjacent the closed cap first end 42a, for dispensing inflation gas from the inflator assembly into the associated airbag. The diffuser assembly base portion 36 additionally includes a plurality of openings 48, adjacent the closed base first end 42b, for passage of inflation gas from the decomposition chamber 14, into the diffuser chamber 40.

The diffuser assembly cap and base portions, 34 and 36, respectively, are aligned with the open second end of each, i.e., ends 44a and 44b, respectively, being closed by sealing means, e.g., by means of a rupture disc 50 abutting thereagainst. The diffuser assembly rupture disc 50 is joined in sealing relation with the diffuser assembly cap and base portions, 34 and 36, respectively, by means of a circumferential weld 51 at the periphery of the disc 50. In the static state, the disc 50 serves to separate the contents of the decomposition chamber 14 from the airbag.

As will be described in greater detail below, the contents of the decomposition chamber include at least one gas source material which undergoes decomposition to form decomposition products including at least one gaseous decomposition product used to inflate the associated airbag device. The contents of the decomposition chamber are normally preferably held therein at relatively low pressure. For example, when containing essentially only nitrous oxide, the chamber contents are generally maintained at a pressure in the range of about 500 psi to about 1400 psi, preferably in a range of about 650 psi to about 800 psi.

It will be appreciated that the pressure of the decomposition chamber can be appropriately varied dependent upon the specific components of the contents contained therein and the physical state thereof. For example, in a decomposition chamber containing a gaseous mixture of nitrous oxide/argon/helium, present in a molar ratio of 20/70/10, the pressure of the decomposition chamber will generally be in the range of about 500 psi to about 5000 psi, preferably in the range of about 2000 psi to about 4500 psi and, more preferably, in the range of about 3000 psi to about 4000 psi.

The decomposition chamber base portion 30 includes a base ring 74 with a base cap 76 joined thereto via a base shoulder connecting portion 78. The base shoulder connecting portion 78 serves as a convenient means of locating the decomposition chamber base portion 30 relative to the sleeve 16, as well as providing a location for a circumferential weld 79 whereby the decomposition chamber base portion 30 is attached in sealing relation with the sleeve 16.

The base cap 76 includes an opening 80 therein, wherethrough an initiator device 82 is attached in sealing relation, such as with a weld, crimping or other suitable hermetic seal, within the decomposition chamber 14. In such an assembly, the initiator device can be of any suitable type of initiator means including: bridgewire, spark-discharge, heated or exploding wire or foil, through bulkhead (e.g., an initiator which discharges through a bulkhead such as in the form of a metal hermetic seal), for example, and may, if desired, optionally contain a desired load of a pyrotechnic charge. In practice, however, a relatively large heat input such as from the initiator, may be helpful in obtaining a more thorough initiation of the decomposition of various gas source materials, such as nitrous oxide ($N_2O$). In view thereof, as pyrotechnic charge-containing initiators can typically more easily produce such relatively large heat inputs from a relatively small sized initiator device, the practice of the invention with such initiators can be particularly advantageous.

As identified above, the contents of the decomposition chamber include at least one gas source material which undergoes exothermic decomposition to form decomposition products including at least one gaseous decomposition product used to inflate the associated airbag device. A wide variety of gas source materials which undergo decomposition to form gaseous products are available. Such gas source materials include:

acetylene(s) and acetylene-based materials such as acetylene and methyl acetylene, as well as mixtures of such acetylene(s) and acetylene-based materials with inert gas(es);

hydrazines such as hydrazine ($N_2H_4$), mixtures of hydrazine(s) and water, methyl derivatives of hydrazine, as well as mixtures of such hydrazine materials with inert gas(es);

peroxides and peroxide derivatives such as methyl hyperoxide ($CH_3OOH$) and mixtures of methyl hyperoxide and methanol, hydrogen peroxide, alkyl hydroperoxides, propionyl and butyryl peroxides, as well as mixtures of such peroxides and peroxide derivatives with inert gas(es); and nitrous oxide ($N_2O$) and mixtures of nitrous oxide with inert gas(es), for example.

The decomposable gas source materials used in the practice of the invention are preferably:

a.) non-toxic and non-corrosive both in the pre- and post-decomposition states;

b.) relatively stable at atmospheric conditions thus permitting and facilitating storage in a liquid phase, where a liquid, as compared to a gas, permits the storage of a greater amount of material in the same volume at a given pressure;

c.) do not require the presence of catalyst(s) to trigger the decomposition reaction, and which catalysts may be difficult to remove or handle; and d.) form products of decomposition which do not contain undesirable levels of undesirable species, such as carbonaceous material (e.g., soot), CO, NO, $NO_2$, $NH_3$, for example.

Thus, in view of manufacture, storage, and handling concerns, a preferred decomposable gas source material for use in the practice of the subject invention, at this time, is believed to be nitrous oxide ($N_2O$).

In accordance with the chemical reaction (1) identified below, upon the decomposition of nitrous oxide, the decomposition products ideally are nitrogen and oxygen:

$$2N_2O = 2N_2 + O_2 \tag{1}$$

Nitrous oxide is a now preferred decomposable gas source material as, in practice, nitrous oxide is generally non-toxic and non-corrosive. Further, nitrous oxide, as compared to gases such as air, nitrogen and argon, liquefies relatively easily at ambient temperatures. Additionally, nitrous oxide is relatively inert up to temperatures of about 200° C. or more. As a result, nitrous oxide is desirably relatively safe to handle, thermally stable, facilitates storage, and alleviates manufacturing concerns.

It is to be understood that the decomposable gas source material can, for example and as desired, be stored in a gaseous, liquid or multi-phase form (i.e., partially gaseous and partially liquid mixture). The premium on size generally placed on modern vehicle design, however, results in a general preference for smaller sized airbag inflators. In view thereof and the fact that the densities for such gas source materials are significantly greater when in a liquid, rather than gaseous form, storage of such materials primarily in a liquid form will typically be preferred.

It is also to be understood that while such decomposable gas source material can be contained within the decomposition chamber in a pure form (e.g., such that the chamber contents include no more than minor levels of other materials, such as air as may be present in the decomposition chamber prior to being filled with the decomposable gas source material), it may be preferred to include an inert gas therewith. For example, an inert gas such as helium can be included with the decomposable gas source material to facilitate leak checking of the inflator apparatus or, more specifically, of the decomposition chamber thereof. Alternatively or in addition, an inert gas, such as argon and helium, for example, or mixture of such inert gases, can be included to supplement the gas produced or formed upon the decomposition of the decomposable gas source material.

In addition, the decomposition chamber can, if and as desired, also include a decomposition sensitizer material to promote or accelerate the rate of the decomposition reaction. Such sensitizer materials are typically hydrogen-bearing materials added to the decomposable gas source material in small amounts. Specifically, the sensitizer material is preferably added to the decomposable gas source material in an amount below the flammability limits for the content mix, such that the contents of the decomposition chamber are preferably at an equivalence ratio of less than 0.25. At such low relative amounts, the chamber contents are essentially nonflammable and thus combustion and the formation of combustion products are practically avoided.

Hydrogen bearing sensitizer materials useable in the practice of the invention are typically gaseous, liquid, solid, or multi-phase combinations thereof including hydrogen, hydrocarbons, hydrocarbon derivatives and cellulosic materials. Preferred hydrocarbon hydrogen bearing sensitizer materials useable in the practice of the invention include paraffins, olefins, cycloparaffins and alcohols. Molecular hydrogen ($H_2$), which does not result in the formation of carbon oxides such as carbon monoxide or carbon dioxide, has been found to be quite effective as a sensitizer and is an especially preferred hydrogen bearing sensitizer material for use in the practice of the invention.

In operation, such as upon the sensing of a collision, an electrical signal is sent to the initiator device 82. The initiator device 82 functions and, when it is a pyrotechnic initiator, discharges high temperature combustion products into the decomposition chamber 14 and the contents thereof, which in a preferred embodiment includes primarily liquid-phase $N_2O$. The large heat addition results in commencement of the exothermic thermal decomposition of the $N_2O$. In this thermal decomposition, the $N_2O$ begins to breakdown into smaller molecular fragments. As the $N_2O$ molecules fragment, the associated release of energy results in further heating of the remaining mixture. Additionally, as the decomposition process proceeds, heating of the mixture results in conversion of at least some of the $N_2O$ from a liquid to a gaseous phase. Thus, this decomposition results in not only both the release of heat and the formation of gaseous decomposition products but also an increase in gaseous species due to the conversion of $N_2O$ from a liquid to a gaseous phase. The increase both in temperature and the relative amount of gaseous products within the decomposition chamber 14 results in a rapid pressure rise within the decomposition chamber.

When the gas pressure within the decomposition chamber 14 exceeds the structural capability of the rupture disc 50, the disc ruptures or otherwise permits the passage of the inflation gas through the diffuser base portion 36 and into the diffuser cap portion 34 and thus allows this inflation gas to vent through the openings 46 into the associated airbag assembly.

Thus, the invention provides an inflator device and associated method for inflating an inflatable device which reduce or minimize handling concerns and provide inflation gas which desirably is harmless, non-toxic and at relatively low temperature when exiting from the inflator assembly. Further, as the inflator assembly 10 illustrated in FIG. 1 in its simplest form includes only a single stored component (i.e., the decomposable gas source material, e.g., $N_2O$) in a relatively small-sized device, such an inflator assembly and adaptations thereof due to factors such as simplicity and low cost, can find wide utility and use.

It will be appreciated that the exothermic decomposition of $N_2O$, while primarily resulting in the formation of $N_2$ and $O_2$, can also produce some comparatively undesirable products, such as NO and $NO_2$, albeit in relatively small amounts as compared to the amount of $N_2O$ originally present in the chamber. In addition, some of the $N_2O$ may not decompose and may be found in the inflation gas released from the inflator assembly.

Figure 2:
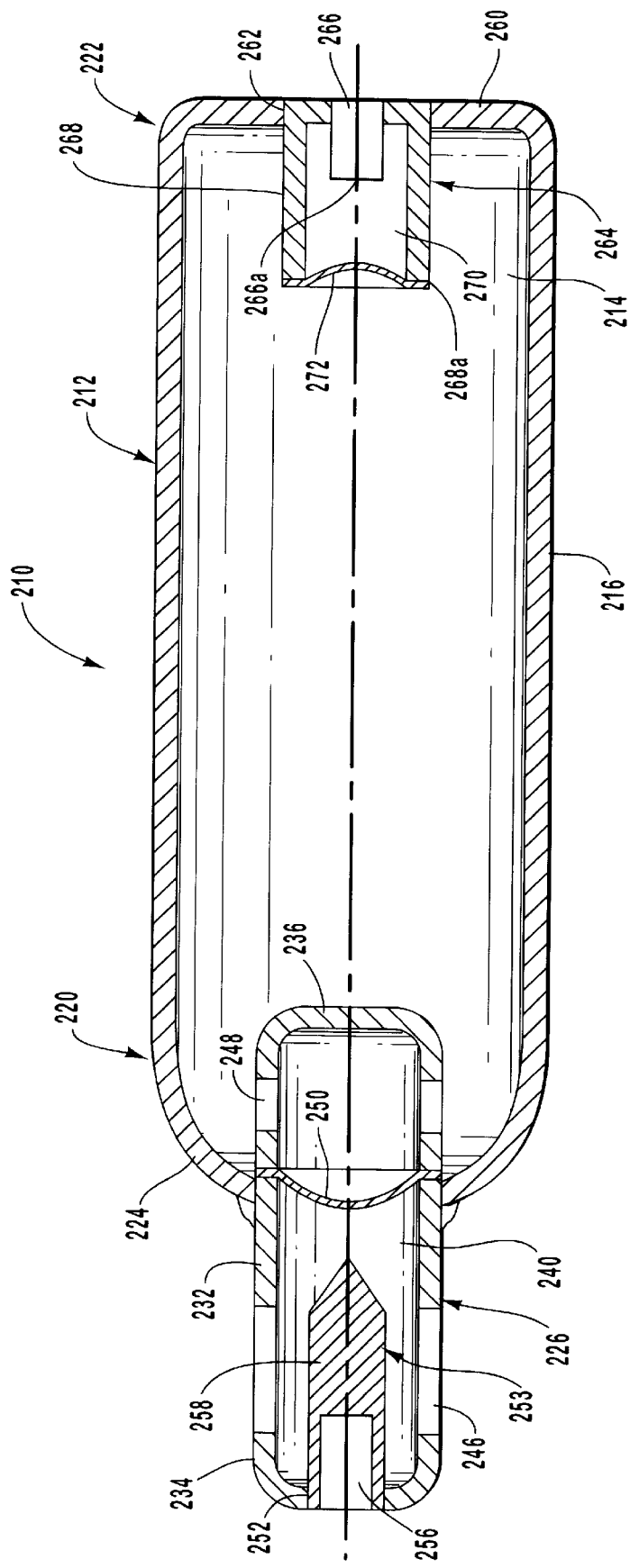
FIG. 2 is a simplified, partially in section, schematic drawing of an adaptive output inflator having a selectable oxidant composition, in accordance with one embodiment of the invention.

FIG. 2 illustrates an adaptive output airbag inflator assembly 210 in accordance with one embodiment of the invention. The inflator assembly 210 comprises a pressure vessel 212 including a storage chamber 214 that contains $N_2O$ and may, if desired, in addition contain either or both one or more inert gases, such as argon or nitrogen, for example, and one or more additional oxidant gases, such as oxygen, for example. It will be appreciated that such inclusion of one or more inert gases, such as argon, can be useful and thus desirable for reducing or minimizing the concentration of generally undesirable species, such as $NO_x$ (where x=1 or 2), and too great a concentration of $N_2O$ in the inflator output, where inflator outputs containing greater than 20 percent by volume of nitrous oxide can be undesired due to the oxidant potential of such an inflator effluent.

The chamber 214 is defined by an elongated generally cylindrical sleeve 216, having a first end 220 and a second end 222. The first end 220 is partially closed by means of a shoulder portion 224. As shown, the shoulder portion 224 can desirably be integral (i.e., formed continuous with and in one piece) with the sleeve 216. A diffuser assembly 226 is attached in sealing relation, such as with a weld, crimping or other suitable hermetic seal, with the shoulder portion 224.

The diffuser assembly 226, like the diffuser assembly 26 described above, comprises a generally cylindrical sleeve 232 having a cap portion 234 and a base portion 236 to define a diffuser chamber 240. The diffuser assembly cap portion 234 includes a plurality of openings 246 for dispensing inflation gas from the inflator assembly into an associated airbag assembly (not shown). The diffuser assembly base portion 236 additionally includes a plurality of openings 248 for passage of inflation gas from the chamber 214 into the diffuser chamber 240.

The diffuser assembly cap and base portions, 234 and 236, respectively, are aligned and closed by sealing means, e.g., by means of a rupture disc 250 abutting thereagainst and in sealing relation therewith, such as by means of a circumferential weld (not shown) at the periphery of the disc 250. In the static state, the disc 250 serves to separate the contents of the chamber 214 from the airbag.

The diffuser assembly cap portion 234 includes an opening 252 therein, wherethrough opening means 253 to open the sealing means, e.g., the rupture disc 250, is attached in sealing relation, such as with a weld, crimping or other suitable hermetic seal. For example, the opening means 253 is illustrated in the form of a squib 256 and an associated projectile 258, the operation of which will be described in greater detail below.

It is to be appreciated that in addition to the mechanical type of opening realized with the use of a projectile, the invention contemplates and encompasses the use of other forms or types of appropriate opening means. For example, if desired, rather than a mechanical opening realized through the use of a projectile, alternative forms of opening that can be used include the use of an initiator such as to supply heat by which application the rupture disc can be caused to rupture or otherwise open.

The sleeve second end 222 is partially closed by means of a cap portion 260. As shown, the cap portion 260 can desirably be integral (i.e., formed continuous with and in one piece) with the sleeve 216. The cap portion 260 includes an opening 262 therein, wherethrough a heat source 264, such as described in greater detail below, is attached in sealing relation, such as with a weld, crimping or other suitable hermetic seal.

The heat source 264 includes an initiator 266. In such an assembly, the initiator 266 can be of any suitable type of initiator means including: bridgewire, spark-discharge, heated or exploding wire or foil, through bulkhead (e.g., an initiator which discharges through a bulkhead such as in the form of a metal hermetic seal), for example, and may, if desired, optionally contain a desired load of a pyrotechnic charge. In practice, however, a relatively large heat input such as from the initiator, may be helpful in obtaining a more thorough initiation of the decomposition of various gas source materials, such as nitrous oxide (NO). In view thereof, as pyrotechnic charge-containing initiators can typically more easily produce such relatively large heat inputs from a relatively small sized initiator device, the practice of the invention with such initiators can be particularly advantageous.

In any case, if the initiator 266 is itself incapable of providing the desired heat input, the heat source 264 may, as shown, include a cup 268 containing an additional pyrotechnic charge 270 (sometimes referred to as a "booster") adjacent the discharge end 266a of the initiator 266. Thus, the cup 268 is sometimes referred to as a "booster cup."

Many different materials are available and useful as boosters. In general, these booster materials can be classified into two general categories or types: those that are fully- or self-oxidized (i.e., they do not generally require an additionally provided oxidant) and those that are under-oxidized (i.e., they generally require an additionally provided oxidant). Preferred self-oxidized booster materials include boron potassium nitrate ($BKNO_3$) and zirconium potassium perchlorate (ZPP). Ethyl cellulose ($C_{24}H_{46}O_{11}$) is an example of an under-oxidized booster material which can be used in the practice of the invention.

Generally, if required, a self-oxidized booster material, such as $BKNO_3$, is preferred as, for example, such self-oxidized boosters can simplify the operational dynamics of the inflator. It will be appreciated that a self-oxidized booster material or propellant will generally not require direct interaction with the stored nitrous oxide, or the decomposition products thereof, in order to properly burn. In general, such self-oxidized materials will ignite with the functioning of the initiator 266 and discharge or interact with the nitrous oxide-including mixture contained within the storage chamber 214. Heat, resulting from reacting booster material, is transferred to the nitrous oxide and decomposition thereof commences.

Operation with an under-oxidized booster material, however, will typically require some oxidant contribution from the stored nitrous oxide in order to properly burn and thus result in the lose of some of the independence of operation normally possible with a similar inflator containing a fully- or self-oxidized booster material. While such under-oxidized materials may ignite, they generally are incapable of burning to completion without such an oxidant contribution. In general, with such an under-oxidized material which ignites with the functioning of the initiator 266 and discharges or interacts with the nitrous oxide-including mixture contained within the storage chamber 214. Heat, resulting from reacting booster material, is transferred to the nitrous oxide and decomposition thereof commences, resulting in the formation of gaseous oxygen which interacts with under-oxidized booster material to permit the combustion thereof.

The heat source 264 is shown as including a rupture disc 272 about the open end 268a of the booster cup 268. It is to be appreciated that the inclusion of such a rupture disc may be desired or needed to ensure hermeticity such as where the initiator 266 may be incapable of withstanding the elevated pressures normally associated with the storage of material within the storage chamber 214 for the extended periods of time that such inflator devices are normally placed in vehicular occupant inflatable restraint systems. It will also be appreciated that other forms or means of separation can, if desired, be utilized including, for example, a retainer in the form of an appropriate foil.

Further, it will be appreciated that the inclusion of such a rupture disc or other suitable closure at the open end 268a of the booster cup 268 will better ensure that the booster charge 270 will remain properly positioned relative to the discharge end 266a of the initiator 266 throughout the lifetime of the unactuated inflator assembly.

In operation, such as upon the sensing of a collision, an electrical signal is sent to either or both the opening means 253 (e.g., the squib 256) and the heat source 264 (e.g., the initiator 266). Further, as will be appreciated, when signals are sent to both the squib 256 and the initiator 266, the timing and sequencing of the signals can be appropriately selected.

For example, in accordance with a first mode of operation, upon receipt of an appropriate signal, only the opening means 253 is actuated such that the squib 256 fires and propels the projectile 258 into the burst disc 250 whereby the disc 250 ruptures or otherwise permits the passage of stored contents of the chamber 214 through the openings 246 into the associated airbag assembly.

As some of the stored nitrous oxide exiting from the inflator assembly 210 will contact the burning pyrotechnic of the squib 256 en route out of the inflator and as the burning pyrotechnic will transfer heat to the exiting gas, decomposition of the nitrous oxide will begin to occur when the gas has been heated to the decomposition temperature of the nitrous oxide. It will be appreciated that the amount of such decomposition will likely be very low as such a method of heating the nitrous oxide is generally not very efficient. In practice, less than about 10 percent and generally less than about 5 percent of the original nitrous oxide load will likely undergo decomposition in such mode of operation. Thus, in such a mode of operation, the gas released from the inflator 214 will primarily constitute the gas which was stored within the storage chamber 214.

In accordance with a second mode of operation, upon the receipt of an appropriate signal, only the heat source 264 is actuated such that the heat source initiator 266 fires and causes the pyrotechnic booster charge 270 to also fire, resulting in the rupture of the disc 272 and, in turn, the heating of the contents of the chamber 214. The proper supplying of heat will result in commencement of the exothermic thermal decomposition of the $N_2O$. As described above, in this thermal decomposition, the $N_2O$ begins to breakdown into smaller molecular fragments. Also, as the $N_2O$ molecules fragment, the associated release of energy results in further heating of the remaining mixture. The increase in both temperature and the relative amount of gaseous products within the decomposition chamber 214 results in a rapid pressure rise within the decomposition chamber.

This mode of operation is very effective in heating the stored nitrous oxide. The more nitrous oxide within the storage chamber 214, the more nitrous oxide decomposition occurs, resulting in additional decomposition products (e.g., heat and decomposition gas products).

When the gas pressure within the decomposition chamber 214 exceeds the structural capability of the rupture disc 250, the disc 250 ruptures or otherwise permits the passage of the inflation gas into the diffuser cap portion 234 and thus allows this inflation gas material to vent through the openings 246 into the associated airbag assembly.

While quantification of the amount of heat required to be supplied by the heat source can, in practice, be difficult, this amount of required heat can be empirically determined by tracking the amount of non-dissociated nitrous oxide which exits from the inflator. To reduce or minimize the amount of non-dissociated nitrous oxide which exits from the inflator, the inflator can be designed to provide additional heat input to the storage chamber 214.

A heat source in the form of a large initiator having a single load of propellant material may be preferred. It will be appreciated, however, that such sufficiently large initiators may not be readily commercially available. In practice, initiators containing in the range of about 35 to about 800 mg of ZPP, with a booster material supply ranging from 0 to about 5 g of $BKNO_3$, are believed useful in the practice of the invention.

As discussed above, if and when desired, signals can be sent to both the squib 256 and the initiator 266, with the timing and sequencing of the signals appropriately selected.

For example, the squib 256 can be first actuated so as to fire and propel the projectile 258 into the burst disc 250 whereby the disc 250 is ruptured or otherwise permits the passage of stored contents from the chamber 214 through the openings 246 into the associated airbag assembly. In this way, the gas initially released from the inflator 214 will essentially constitute ambient temperature gas which was stored within the storage chamber 214 with, as described above, possibly only minor amounts of the original nitrous oxide load undergoing decomposition when only the squib 256 has been actuated.

At an appropriate later interval of time, the initiator 266 can be actuated so as to supply heat to remaining contents of the storage chamber 214, including the remaining nitrous oxide to result in commencement of the exothermic thermal decomposition of the remaining nitrous oxide. It is to be appreciated that the decomposition products which may have resulted from the earlier firing of the squib 256 are formed as the material is exiting from the inflator assembly, the impact of such decomposition on the operation of the inflator assembly upon actuation of the initiator 266 will, at most, be relatively minor and the two levels of operation can occur, as described above, relatively independently of each other.

Figure 3:
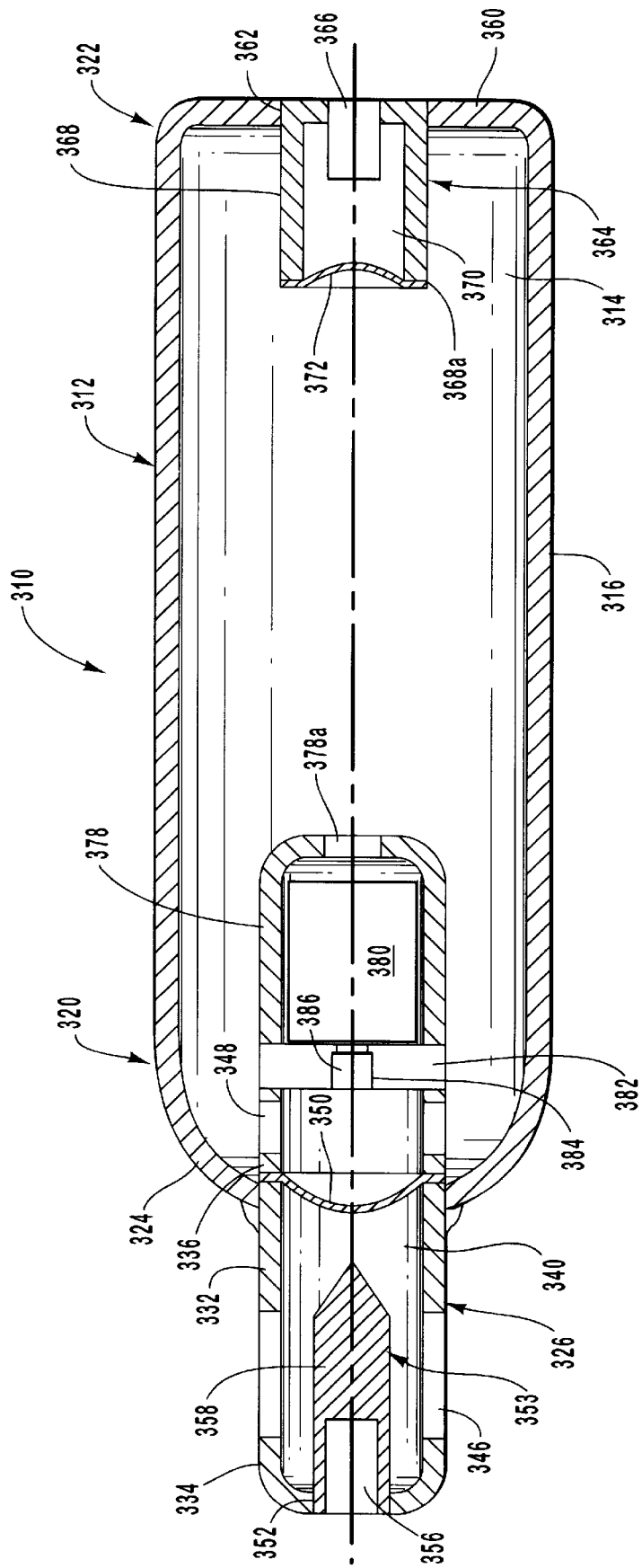
FIG. 3 is a simplified, partially in section, schematic drawing of an adaptive output inflator, in accordance with another embodiment of the invention.

FIG. 3 illustrates an adaptive output airbag inflator assembly, designated by the reference numeral 310, in accordance with an alternative embodiment of the invention. The adaptive output airbag inflator assembly 310 is generally similar to the inflator assembly 210, described above, and includes a pressure vessel 312 including a chamber 314 that, as with the chamber 214 described above, contains $N_2O$ and may, if desired, in addition contain either or both one or more inert gases, such as argon or nitrogen, for example, and one or more additional oxidant gases, such as oxygen, for example.

The chamber 314 is defined by an elongated generally cylindrical sleeve 316, having a first end 320 and a second end 322. A diffuser assembly 326, similar to the diffuser assembly 226 described above, is attached with the shoulder portion 324 at first end 320 and a heat source 364, similar to the heat source 264 described above, attached at the second end 322.

The diffuser assembly 326 includes a generally cylindrical sleeve 332 having a cap portion 334 and a base portion 336 to define a diffuser chamber 340 with a rupture disc 350 serving to separate the contents of the chamber 314 from the associated airbag (not shown). The diffuser assembly cap and base portions, 334 and 336, respectively, each includes a plurality of openings 346 and 348, respectively, as described above relative to diffuser assembly 226.

The diffuser assembly 326, similar to the above-described diffuser assembly 226, includes opening means 353 to open the sealing means, e.g., the rupture disc 350. The opening means 353 is illustrated in the form of a squib 356 and an associated projectile 358.

The heat source 364, similar to the heat source 264, includes an initiator 366, a booster cup 368 containing an additional pyrotechnic charge 370, and a rupture disc 372 about the open end 368a of the booster cup 368.

The inflator assembly 310 differs from the assembly 210 described above by the inclusion of a gas generant chamber 378 containing a gas generant 380, adjacent the diffuser chamber 340. In addition, the wall 382 between the diffuser chamber 340 and the gas generant chamber 378 includes an igniter storage volume 384 containing an igniter material 386 such as including an appropriate primer material such as known in the art, such as of a lead styphnate tetracene type non-corrosive mixture and, if desired, a secondary ignition charge such as formed of boron potassium nitrate. The igniter material 386, when actuated, serves to ignite the gas generant 380.

The gas generant 380 is preferably a self- or fully-oxidized propellant such as a gas generant of a transition metal amine nitrate with oxidizer and binder, polyvinyl chloride (PVC) with potassium perchlorate (KP), cellulose acetate with KP, as well as other binders and fuels with oxidizers. In general, similar to the above-described booster materials, the use of such self- or fully-oxidized materials is generally preferred as such use can simplify the operational dynamics of the inflator.

Alternatively, the gas generant 380 can, if desired be under-oxidized such as constituting only a fuel such as cellulose acetate; solid propellants such as (gun type, lova) glycidal azide polymer/RDX/cellulose acetate butyrate; and nitrocellulose/nitrate ester (TEGDN)/ethyl cellulose/ stabilizers, for example.

As discussed above in connection with the booster materials, under-oxidized materials will typically require an oxidant contribution from the stored nitrous oxide in order to properly burn. The utilization of nitrous oxide as an oxidant source material in the practice of the invention offers various desirable aspects including, for example, high combustion temperatures (such as due at least in part to release of bond energy upon decomposition of the nitrous oxide molecule) and enhanced molar output (related to the decomposition of the nitrous oxide molecule).

It is to be appreciated that, in accordance with a preferred practice of the invention, at most only a relatively minor amount of the stored nitrous oxide is utilized in the oxidation of either or both such under-oxidized gas generants and under-oxidized booster materials. The major proportion or amount of the stored nitrous oxide is included for its decompositional inflation gas production effect. In practice, no more than about 15 percent of the nitrous oxide (on a mass basis) is utilized in such oxidation of either or both such under-oxidized gas generants and under-oxidized booster materials.

The gas generant chamber 378 has an outlet opening 378a wherethrough gas generant reaction products including, for example, gas and heat such as produced upon the combustion of the gas generant material, can exit the gas generant chamber 378 and be in fluid communication with the contents of the storage chamber 314.

In the static or normal state for the inflator assembly 310, the outlet opening 378a can, if desired and as shown, be in an open condition. It is to be understood, however, that the outlet opening, can if desired, be closed or sealed by the incorporation of an appropriate closure. For example, the inclusion of such a closure may be desired where the stored or at rest state isolation of the gas generant from the contents of the storage chamber 314 is desired. It will be appreciated that, dependent on the specific assembly design and operation, such an appropriate closure can take various forms including that of a foil seal or a rupture disc, for example.

In operation, such as upon the sensing of a collision, an electrical signal is sent to either or both the opening means 353 (e.g., the squib 356) and the heat source 364 (e.g., the initiator 366). Further, as will be appreciated, when signals are sent to both the squib 356 and the initiator 366, the timing and sequencing of the signals can be appropriately selected.

It will be appreciated that the output level of the above-described inflator assembly can, as has been described above relative to the assembly 210, be appropriately selected to meet the inflation output requirements of particular airbag inflation and deployment events.

It will be appreciated that the utilization of such an inflator assembly 310 can be especially desirable in an adaptive output inflation system wherein the inflation gas output from the inflator or, more specifically, into a particular inflatable airbag safety restraint is appropriately adapted, varied, or selected, dependent on the specific sensing of at least one airbag operating condition such as ambient temperature, occupant presence, seat belt usage and deceleration of the motor vehicle, for example. For example, the nitrous oxide contained within the storage chamber 314 can be initiated to undergo decomposition in accordance with the chemical reaction (1) identified above. The product gas resulting from such a reaction remains an oxidant, owing to the presence of molecular oxygen. In addition, the temperature and pressure of the product gas would be increased such as through the release of bond energy originally binding the parent molecule $N_2O$ together. Moreover, as the combustion reaction rates of gas generants are generally strongly pressure dependent, the rate of reaction will increase with increased decomposition of the nitrous oxide and, in turn, further increase the rate of inflation gas generation.

In accordance with a first mode of operation, upon receipt of an appropriate signal, only the opening means 353 is actuated such that the squib 356 fires and propels the projectile 358 into the burst disc 350 whereby the disc 350 ruptures or otherwise permits the passage of stored contents of the chamber 314 through the openings 346 into the associated airbag assembly.

In such operation, the projectile 358, after contacting and resulting in the opening of the rupture disc 350, proceeds to contact and initiate the igniter material 386, resulting in the ignition thereof. In turn, gas generation via the reaction of the gas generant 380 is initiated. Gas and heat produced as a result of reaction of the gas generant material exits the gas generant chamber 378 through the opening 378a and is placed in fluid communication with the contents of the storage chamber 314, resulting in the further heating thereof.

In accordance with a second mode of operation, upon the receipt of an appropriate signal, only the heat source 364 is actuated such that the heat source initiator 366 fires and causes the pyrotechnic booster charge 370 to also fire, resulting in the rupture of the disc 372 and, in turn, the heating of the contents of the chamber 314. The proper supplying of heat will result in commencement of the exothermic thermal decomposition of the $N_2O$. As described above, in this thermal decomposition, the $N_2O$ begins to breakdown into smaller molecular fragments. Also, as the $N_2O$ molecules fragment, the associated release of energy results in further heating of the remaining mixture. The increase in both temperature and the relative amount of gaseous products within the decomposition chamber 314 results in a rapid pressure rise within the decomposition chamber.

When the gas pressure within the decomposition chamber 314 exceeds the structural capability of the rupture disc 350, the disc 350 ruptures or otherwise permits the passage of the inflation gas into the diffuser cap portion 334 and thus allows this inflation gas material to vent through the openings 346 into the associated airbag assembly.

While the gas generant-containing inflator assembly 310 has been described above with the use of an igniter material 386 to initiate reaction of the gas generant material 380, it will be understood that the invention is not so limited. For example, it will be appreciated that operation of the heat source alone or in conjunction with the associated heat resulting from decomposition of nitrous oxide stored within inflator can be sufficient to ignite the stored gas generant and result in reactions products such as additional gas products and heat, for example. As a result, the inflator assembly can be further simplified by not requiring the inclusion of the igniter 386 and therefore be less difficult and costly to manufacture.

Figure 4:
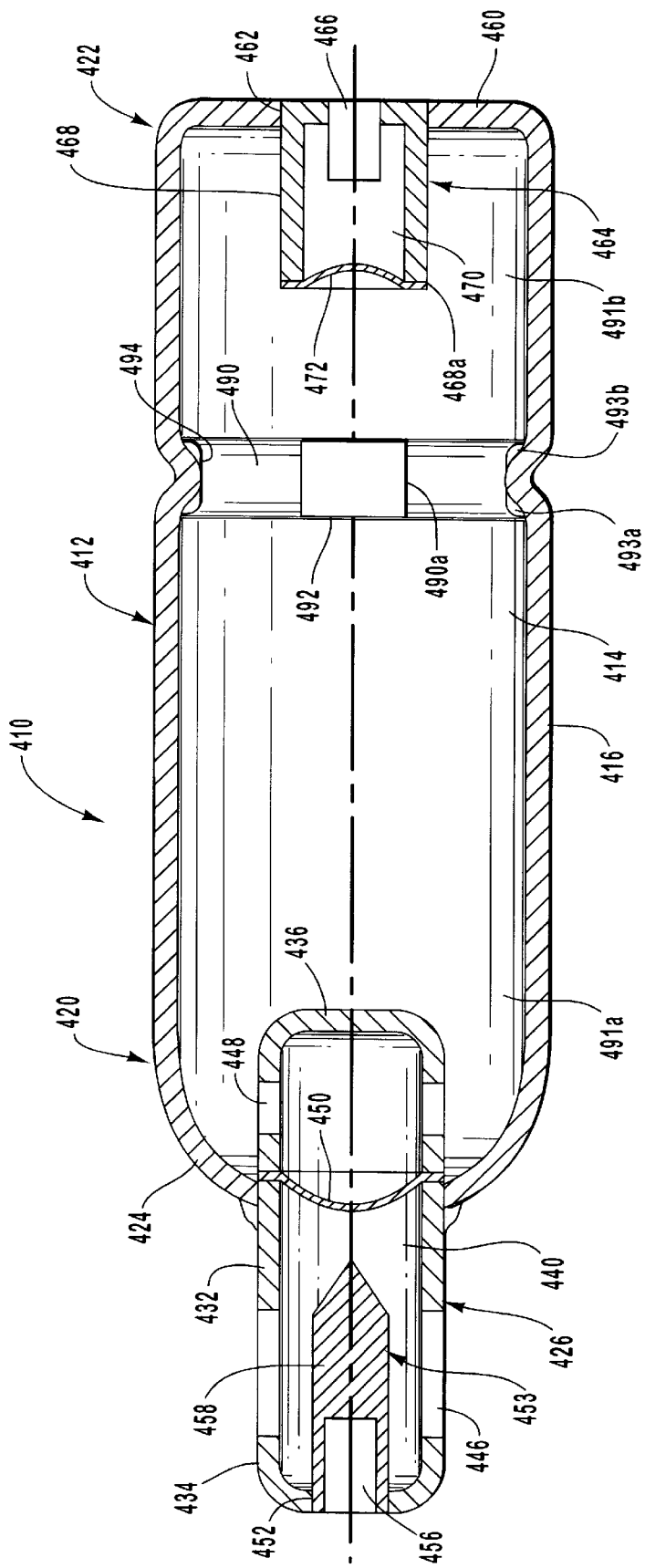
FIG. 4 is a simplified, partially in section, schematic drawing of an adaptive output inflator, in accordance with an alternative embodiment of the invention.

FIG. 4 illustrates, in accordance with an alternative embodiment of the invention, an adaptive output airbag inflator assembly, designated by the reference numeral 410. The adaptive output airbag inflator assembly 410 is generally similar to the inflator assembly 210, described above, and includes a pressure vessel 412 including a chamber 414 that contains $N_2O$ and may, if desired, in addition contain either or both one or more inert gases, such as argon or nitrogen, for example, and one or more additional oxidant gases, such as oxygen, for example.

The chamber 414 is defined by an elongated generally cylindrical sleeve 416, having a first end 420 and a second end 422. A diffuser assembly 426, similar to the diffuser assembly 226 described above, is attached with the shoulder portion 424 at first end 420 and a heat source 464, similar to the heat source 264 described above, attached at the second end 422.

The diffuser assembly 426 includes a generally cylindrical sleeve 432 having a cap portion 434 and a base portion 436 to define a diffuser chamber 440 with a rupture disc 450 serving to separate the contents of the chamber 414 from the associated airbag (not shown). The diffuser assembly cap and base portions 434 and 436 each includes a plurality of openings 446 and 448, respectively, as described above relative to diffuser assembly 226.

The diffuser assembly 426, similar to the above-described diffuser assembly 226, includes opening means 453 to open the sealing means, e.g., the rupture disc 450. The opening means 453 is illustrated in the form of a squib 456 and an associated projectile 458.

The heat source 464, similar to the heat source 264, includes an initiator 466, a booster cup 468 containing an additional pyrotechnic charge 470, and a rupture disc 472 about the open end 468a of the booster cup 468.

The inflator assembly 410 differs from the assembly 210 described above by the inclusion of a flow restricting divider or bulkhead 490 separating the storage chamber 414 into first and second sections 491a and 491b, respectively. The divider 490 includes a flow passage 490a, shown centrally located thereon, and sealing means in the form of a foil seal 492. The foil seal is preferably fabricated of a metal such as an INCONEL (an alloy of nickel and chromium) of Huntington Alloys, Inco Alloys International, Inc. and serves to further appropriately restrict the flow of material between the sections 491a and 491b. The circumferential surface of the divider 490 has the form of spaced apart shoulders 493a and 493b, with a body portion 494 of reduced circumference therebetween. The so shaped and formed divider 490 is secured within the inflator assembly 410 by simply crimping the sleeve 416 to snugly fit adjacently and about the divider body portion 494, between the shoulders 493a and 493b.

The incorporation or use of such a divider within an inflator assembly of the invention can serve one or more of several purposes or functions. For example, the incorporation of the divider 490 in the above-described inflator assembly 410 can serve to initially retain a selected portion of the nitrous oxide stored within the storage chamber 414, e.g., substantially that portion of the stored nitrous oxide originally contained within the second section 491b, adjacent the heat source 464. As a result, when the heat source 464 is actuated, the stored nitrous oxide retained in the second section 491b can be more effectively heated by the heat source 464 and thereby undergo a more complete or total decomposition, resulting in the further generation of heat and gaseous products.

Additionally, the incorporation of the divider 490 in the above-described inflator assembly 410 can provide the assembly with additional or increased control over the mass flow rate of the products, e.g., inflation gas, therefrom. For example, in accordance with one mode of operation, upon receipt of an appropriate signal, the opening means 453 is actuated such that the squib 456 fires and propels the projectile 458 into the burst disc 450 whereby the disc 450 ruptures or otherwise permits the passage of stored contents of the section 491a of storage chamber 414 through the openings 446 into the associated airbag assembly.

At an appropriate selected time interval after the actuation of the opening means 453, the heat source 464 is actuated such that the heat source initiator 466 fires and causes the pyrotechnic booster charge 470 to also fire, resulting in the rupture of the disc 472 and, in turn, the heating of the contents of the second section 491b of the storage chamber 414. The proper supplying of heat will result in commencement of the exothermic thermal decomposition of nitrous oxide stored within the chamber section 491b. As described above, in this thermal decomposition, the $N_2O$ begins to breakdown into smaller molecular fragments. Also, as the $N_2O$ molecules fragment, the associated release of energy results in further heating of the remaining mixture. The increase in both temperature and the relative amount of gaseous products within the decomposition chamber section 491b results in a rapid pressure rise therewithin.

When the gas pressure within the decomposition chamber section 491b exceeds the structural capability of the foil seal 492, the seal ruptures or otherwise permits the passage of the inflation gas into the chamber section 491a and subsequently out of the inflator assembly 410 and into the associated airbag (not shown).

It will be appreciated, that in such an inflator assembly in a static condition wherein the same composition of gas is stored within the first and second section of the storage chamber, the divider need not form a hermetic divider or seal between the chamber sections. Thus, the divider need not be welded to and within the storage chamber. As a result, the divider can be incorporated within the inflator assembly by a simple crimping process and the storage chamber sections do not require to be leak checked, thereby simplifying assembly and manufacture. As a result, the invention provides an inflator assembly of improved reliability and reduced cost, as generally compared to previously available inflator assemblies.

It is to be understood that the divider can, if desired, take other forms or configurations such as to meet the specific processing and operational needs in particular applications. For example, it will be appreciated that the divider can, if desired, be made or formed to include a plurality of flow passages therethrough, joining the first and second sections of the storage chamber. Further, such flow passages can take the form of holes or orifices of various size and shape and are not limited to being circular in cross section or all being of the same size. Still further, with an inflator assembly which includes such a divider which incorporates a plurality of such flow passages, it is to be understood that these flow passages can be sealed or covered, as desired, including embodiments wherein some of the flow passages are sealed or covered and other of the flow passages remain open or not sealed or closed. In one preferred embodiment, an inflator assembly in accordance with the invention includes such a divider which includes numerous small hole flow passages therein and such flow passages are not covered or sealed.

Figure 5:
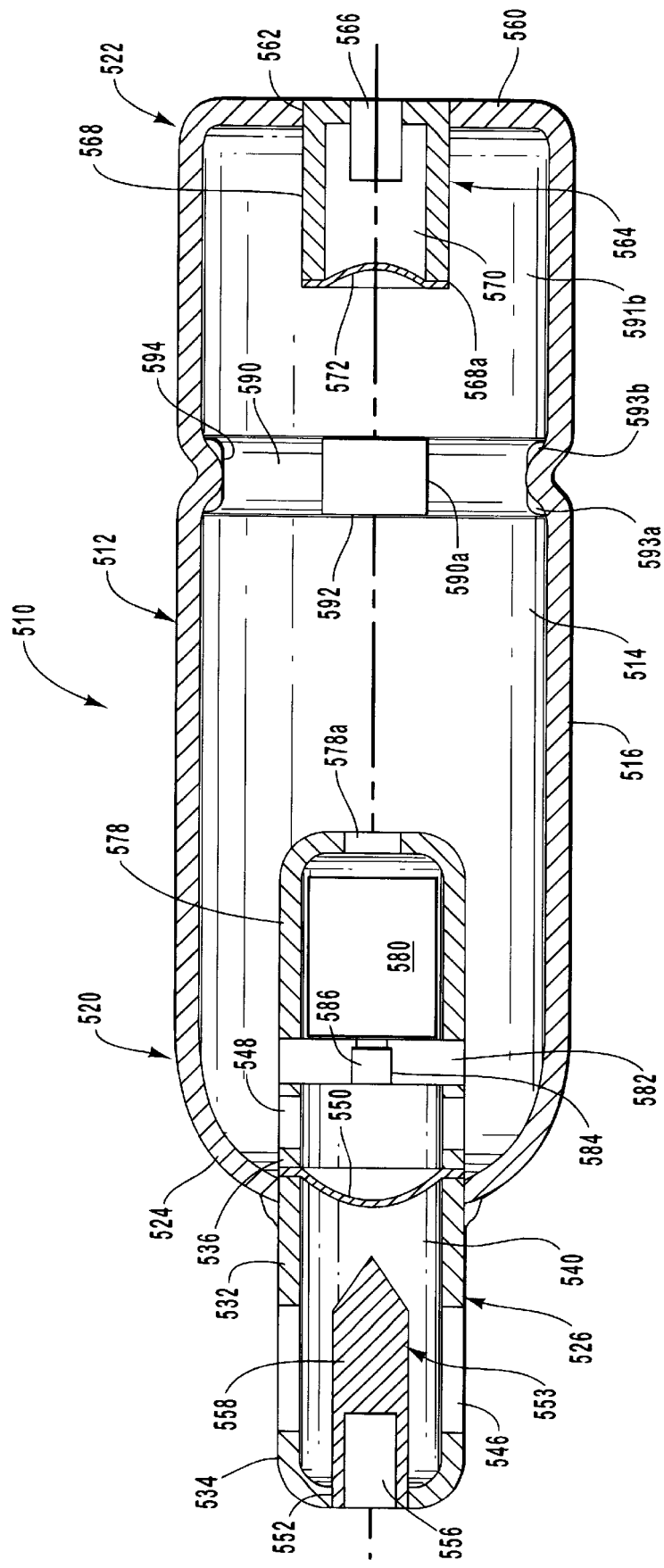
FIG. 5 is a simplified, partially in section, schematic drawing of an adaptive output inflator, in accordance with another alternative embodiment of the invention.

FIG. 5 illustrates, in accordance with an alternative embodiment of the invention, an adaptive output airbag inflator assembly, designated by the reference numeral 510. The inflator assembly 510 combines certain of the features of the inflator assemblies 310 and 410, described above.

More specifically, the inflator assembly 510 like those described above includes a pressure vessel 512 including a chamber 514 that contains $N_2O$ and may, if desired, in addition contain either or both one or more inert gases, such as argon or nitrogen, for example, and one or more additional oxidant gases, such as oxygen, for example.

The chamber 514 is defined by an elongated generally cylindrical sleeve 516, having a first end 520 and a second end 522. A diffuser assembly 526, similar to the diffuser assembly 226 described above, is attached with the shoulder portion 524 at first end 520 and a heat source 564, similar to the heat source 264 described above, attached at the second end 522.

The diffuser assembly 526 includes a generally cylindrical sleeve 532 having a cap portion 534 and a base portion 536 to define a diffuser chamber 540 with a rupture disc 550 serving to separate the contents of the chamber 514 from the associated airbag (not shown). The diffuser assembly cap and base portions 534 and 536 each includes a plurality of openings 546 and 548, respectively, as described above relative to diffuser assembly 226.

The diffuser assembly 526, similar to the above-described diffuser assembly 226, includes opening means 553 to open the sealing means, e.g., the rupture disc 550. The opening means 553 is illustrated in the form of a squib 556 and an associated projectile 558.

The heat source 564, similar to the heat source 264, includes an initiator 566, a booster cup 568 containing an additional pyrotechnic charge 570, and a rupture disc 572 about the open end 568a of the booster cup 568.

The inflator assembly 510, like the inflator assembly 310 described above, includes a gas generant chamber 578 having an outlet opening 578a and containing a gas generant 580, adjacent the diffuser chamber 540 and, in the wall 582 between the diffuser chamber 540 and the gas generant chamber 578, an igniter storage volume 584 containing an igniter material 586 to ignite the gas generant 580, when actuated.

In addition, the inflator assembly 510, like the inflator assembly 410 described above, includes a divider 590 separating the storage chamber 514 into first and second sections 591a and 591b, respectively. As with the above-described divider 490, the divider 590 includes a flow passage 590a and sealing means in the form of a foil seal, such as described above, 592 normally closing and preventing material passage through the flow passage 590a. The circumferential surface of the divider 590 has the form of spaced apart shoulders 593a and 593b, with a body portion 594 of reduced circumference therebetween. The so shaped and formed divider 590 is secured within the inflator assembly 510 by simply crimping the sleeve 516 to snugly fit adjacently and about the divider body portion 594, between the shoulders 593a and 593b.

Figure 6A:
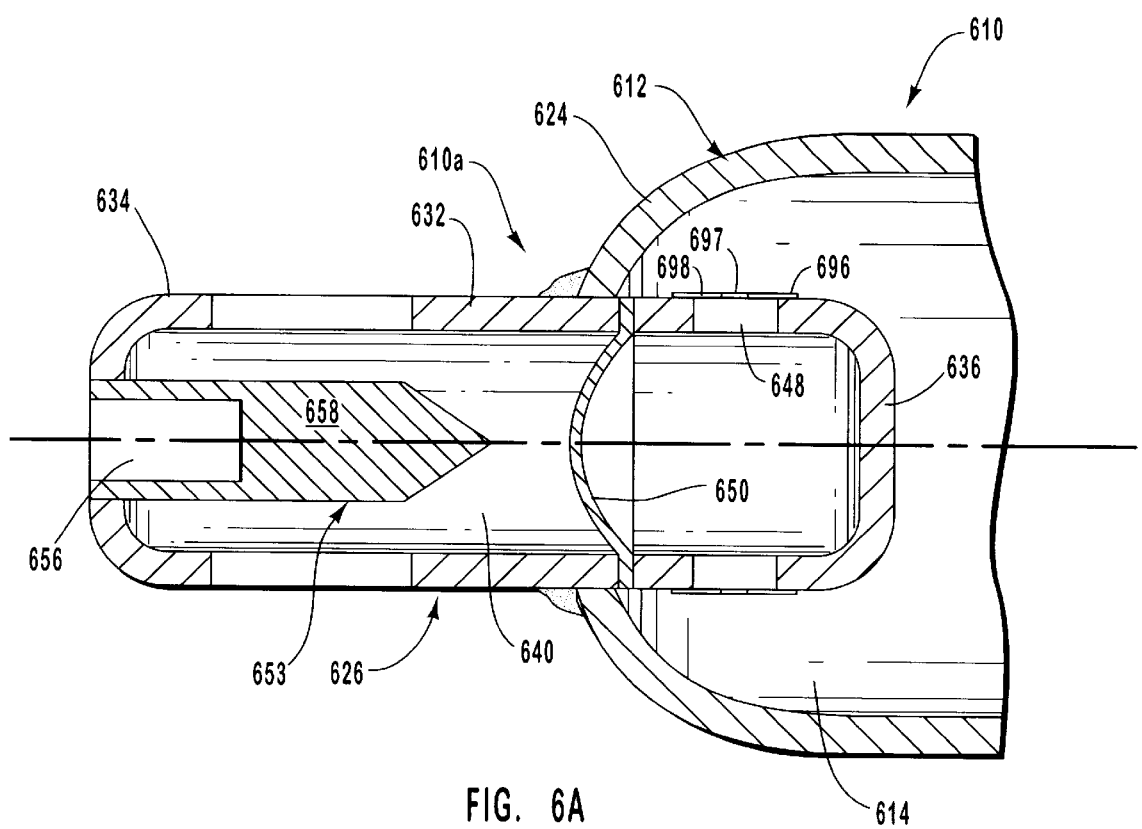
FIGS. 6A and 6B are simplified, partially in section, fragmentary schematic drawings of a diffuser end portion of an adaptive output inflator showing diffuser openings in initial and post-operational stage, respectively, in accordance with one embodiment of the invention.
Figure 6B:
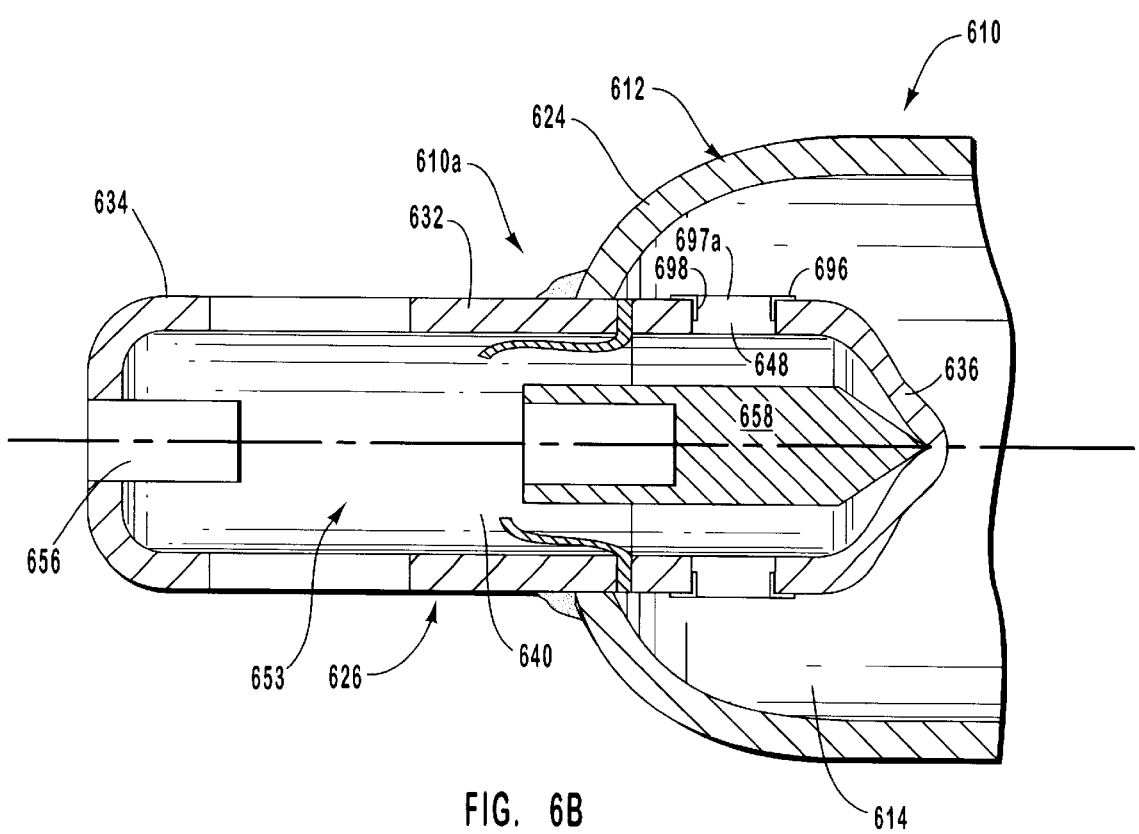

Turning to FIGS. 6A and 6B, there is illustrated a diffuser end portion 610a of an adaptive output inflator for an inflator assembly 610, similar to the inflator assembly 210, described above. Similar to the inflator assembly 210, the inflator assembly 610 includes a pressure vessel 612 having a chamber 614. The inflator assembly 610 also includes an inflator diffuser assembly 626. The diffuser assembly 626 has the form of a generally cylindrical sleeve 632 with a cap portion 634 and a base portion 636 to define a diffuser chamber 640. A rupture disc 650 serves to separate the contents of the chamber 614 from the associated airbag (not shown). The diffuser assembly 626 also includes opening means 653, illustrated in the form of a squib 656 and an associated projectile 658 to open the sealing means, e.g., the rupture disc 650.

As shown, the diffuser base portion 636 includes openings 648 in the sleeve 632 for passage of inflation gas from the inflator assembly storage chamber 614 into the diffuser assembly 626.

As shown in FIG. 6A, partially overlying the sleeve 632 is a sheet or section of flow restricting material or shim stock 696 which forms an opening 697, generally concentric with the underlying opening 648 in the sleeve 632. In one particular embodiment of this aspect of the invention, the flow restricting material constituted 0.02 inch thick aluminum shim stock. The opening 697 in the material 696 is smaller than the opening 648 in the sleeve 632 when the inflator assembly is in the initial or static state. Thus, a portion of the flow restricting material 696 in the vicinity of the opening 697, designated by the reference numeral 698, is not directly supported by and in direct contact with the underlying sleeve 632.

Upon actuation of the inflator 610, the flow of gaseous material through the opening 697 and, subsequently, through the opening 648, is restricted due to the relatively smaller size of the opening 697. However, during the course of operation of the inflator, when the pressure differential between the outer and inner surfaces of the opening 697, e.g., between the internal cavity of the inflator (the storage chamber 614) and the inside of the diffuser assembly 626, increases and becomes sufficiently large, the restricting material portion 698 bends or otherwise permits the area of the opening 697a (shown in FIG. 6B) to increase and thus permit an increased flow of material therethrough.

The incorporation of such flow restricting openings in an inflator assembly in accordance with the invention can permit an associated airbag to be inflated in a more gentle or, at least initially, a more gradual manner than is possible with conventional standard inflation systems. Such an ability to initially provide a low flow rate of inflation material into an airbag, followed by a later, higher flow rate of inflation material is generally recognized as significant and important in the inflatable supplemental restraint of out-of-position occupants.

It is to be understood, however, that the mass flow rate of inflation material into an airbag is generally not the sole factor in the proper design of an adaptive inflation system. In practice, other factors such as the resulting bag rise rate, for example, also need be considered and evaluated.

It will be appreciated that while the use of such flow restricting material in the practice of this aspect of the invention can be advantageously done at the various flow throttling orifices within the inflator, not all such throttling orifices need include such flow restricting material. For example, in an inflator assembly comprising a plurality of such throttling orifices, one or more of such orifices may be left without such a flow restricting material.

Further, it will be appreciated that the invention encompasses various alternative forms for the incorporation of such a flow restricting material in inflator assemblies. For example, the invention encompasses the use of such a flow restricting material to completely cover one or more selected throttling orifices of the inflator in the static state. In operation with such an inflator, when the pressure differential on the opposed sides of the flow restricting material covering a selected throttling orifice becomes sufficiently large, the flow restricting material will fail, rupture or otherwise open to permit the passage of inflation material through the underlying orifice and into the associated airbag.

It will also be appreciated that the flow restricting material can be fabricated of different materials of construction and the material of construction can be fabricated to have various selected thicknesses in order to provide particular desired performance characteristics, such as bending to increase the opening size therethrough at selected pressure differentials.

It will further be appreciated, that such flow restricting materials can be attached or joined to the inflator assembly by various methods or techniques including welding, such as by tack or laser welding, or bonding, such as adhesive chemical bonding, for example. In addition, the flow restricting material can, if desired, simply be held in place by an appropriate surrounding structure.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

Examples 1–6 and Comparative Examples 1 & 2

In these runs, an airbag inflator assembly generally similar to the inflator assembly 310, described above, was utilized. As described below, in Comparative Examples 1 and 2, however, the stored gas within the storage chamber 314 did not include nitrous oxide. In each of these runs, the inflator included:

a) within the gas generant chamber 378, a constant generant load of 18 grams of a gas generant comprising a transition metal amine nitrate with oxidizer and binder;

b) within the storage chamber 314, a constant gas load of 130 grams of stored gas;

c) a heat source 364 of 2.3 grams of $BKNO_3$; and d) the composition of the gas stored within the storage chamber 314 was varied as provided in TABLE 1, below.

TABLE 1

|  | % Ar | % $N_2O$ | % He |
|---|---|---|---|
| Comp. Ex. 1 & 2 | 90 | 0 | 10 |
| Examples 1 & 4 | 80 | 10 | 10 |
| Examples 2 & 5 | 75 | 15 | 10 |
| Examples 3 & 6 | 70 | 20 | 10 |

OPERATION

In each of these runs, the respective inflator was fired into a 100 liter tank. In Comparative Example 1 and Examples 1–3, the respective inflators were operated in accordance with the first mode of operation, i.e., with the squib 356 and not the heat source initiator 366 being actuated. In Comparative Example 2 and Examples 4–6, the heat source initiator 366 was actuated 10 milliseconds subsequent to actuation of the squib 356.

DISCUSSION OF RESULTS

Figure 7:
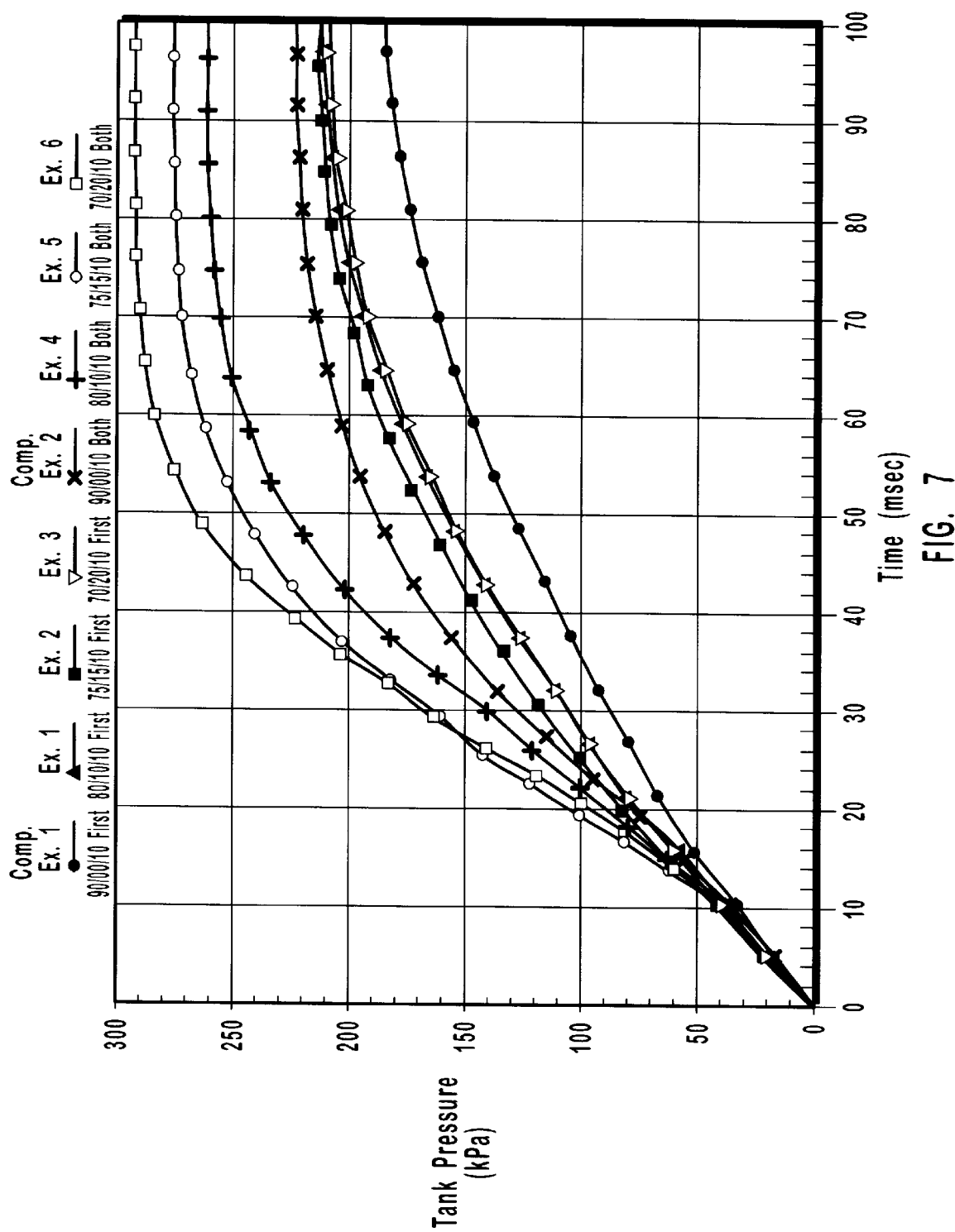
FIG. 7 shows the tank pressure versus time performance obtained in Comparative Examples 1–2 using inflator assemblies which contained no nitrous oxide and in Examples 1–6 using inflator assemblies which contained nitrous oxide in selected relative amounts and in accordance with an embodiment of the invention.

The results of these examples and comparative examples are provided in the following graph (FIG. 7) which shows gas output measured in terms of tank pressure versus time.

The increased performance realized in Example 1, as compared to Comparative Example 1, is directly attributable to decomposition of nitrous oxide in this single stage operation. The plots of Examples 2 and 3 (for stored gas compositions containing 15% and 20% nitrous oxide, respectively), indicate essentially constant output, even though the stored loads of nitrous oxide are increasingly higher. Such essentially constant output is believed to be due to the squib 356 not providing sufficient heat to result in more extensive decomposition of the stored nitrous oxide.

The increased performance realized in Comparative Example 2, as compared to Comparative Example 1, is believed attributable to the additional heat supplied from the heat source 364. Note that in Examples 4, 5 and 6, the performance of the inflator assembly progressively increased with increasing nitrous oxide concentration in the stored gas chamber.

These experimental results lead to several significant conclusions:

1. Inflator performance is significantly different dependent on the selected mode of operation.

2. Increased inflator performance can be attributed to the presence and associated decomposition of increased relative amounts of nitrous oxide.

3. Some decomposition of stored nitrous oxide occurs in first mode operation wherein only the opening means squib is actuated.

4. The output level realized when both the opening means squib and the heat source initiator are actuated is essentially independent of the output level which is realized when only the opening means squib is actuated.

5. The output level realized when both the opening means squib and the heat source initiator are actuated substantially simultaneously increased with an increase in the relative amount of nitrous oxide stored therein.

Example 7 and Comparative Example 3

In this example and comparative example, the concept of flow restricting throttling openings, similar in nature to those described above in connection with FIGS. 6A and 6B, were tested. Specifically, a hybrid inflator with flow restricted throttling orifices (Example 7) and without flow restricting throttling openings (Comparative Example 3) were tested by being, respectively fired into a 60 liter test tank.

Specifically, in both this example and comparative example, a hybrid inflator featuring a 30 gram load of a gas generant comprising a transition metal amine nitrate with oxidizer and binder and a stored gas load of 145 grams of a gas mixture of 95 molar percent argon and 5 molar percent helium was used.

In Comparative Example 3, the inflator included four throttling orifices or holes, each with a 0.246 inch diameter.

In Example 7, the inflator featured two separate rows of throttling orifices or holes in the diffuser. The first row of throttling orifices contained two uncovered 0.100 inch diameter holes. The second row of throttling orifices contained six 0.188 inch diameter holes, each covered with 0.020 inch thick aluminum shim stock.

RESULTS and DISCUSSION

Examination of the unit fired in Example 7 showed that three of the six 0.188 inch diameter holes initially covered with the shim stock opened during testing to expose the underlying flow orifices.

Figure 8:
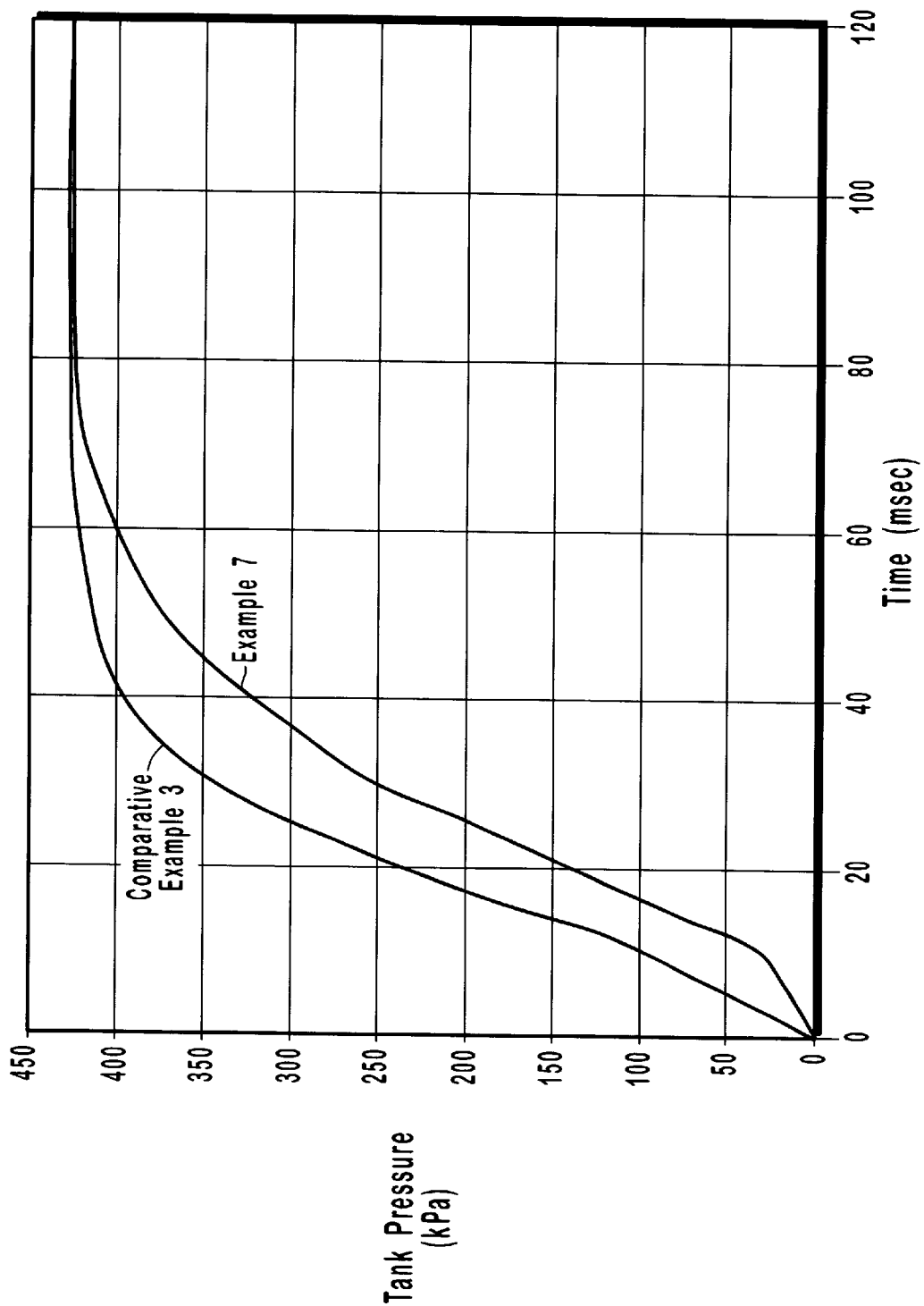
FIG. 8 shows the tank pressure versus time performance obtained in Comparative Example 3 and Example 7.
Figure 9:
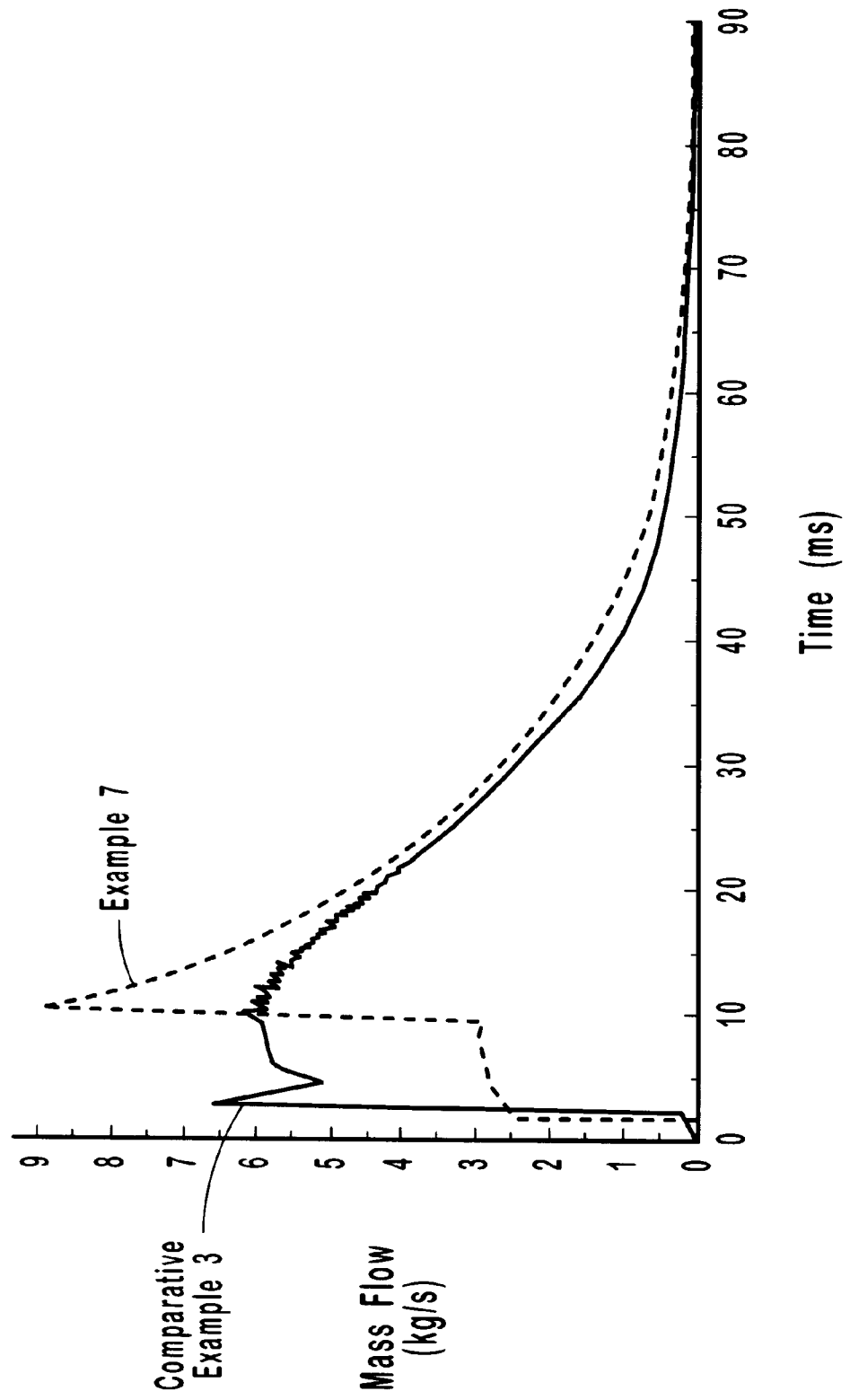
FIG. 9 shows the mass flow versus time performance predicted for the inflator assemblies of Comparative Example 3 and Example 7.

FIG. 8 shows the tank pressure versus time performance obtained in Comparative Example 3 and Example 7. FIG. 9 shows the mass flow versus time performance predicted for the inflator assemblies of Comparative Example 3 and Example 7.

As shown in FIG. 8, the inflator of Example 7 provided a lower initial rise rate or onset. That is, in the initial approximately 10 ms of operation the slope of the tank pressure versus time line was significantly reduced in Example 7 as compared to Comparative Example 3. Ultimately, however, the inflators of both Example 7 and Comparative Example 3 achieved approximately the same maximum tank pressure.

Thus, these results highlight as a potential benefit of the incorporation of such flow restricted orifices the possibly desirable slower onset of initial bag deployment while ultimately providing the same maximum output pressure.

As shown in FIG. 9, the inflator of Comparative Example 3 is predicted to have an initial mass flow (the mass flow during the initial approximately 10 ms of operation) almost twice that predicted for the inflator of Example 7. However, at 10 ms, the shim stock orifice coverings are predicted to fail, thereby allowing the mass flow from the inflator to increase dramatically. With such failure and consequent increase in open orifice area, the mass flow for the inflator of Example 7 is predicted to dramatically increase, with the mass flow for the inflator of Example 7 predicted to briefly exceed that of the inflator of Comparative Example 3. Shortly thereafter, however, the mass flows from each of these inflators is predicted to be essentially the same.

In view of the above, it will be appreciated that the invention provides adaptive inflation systems whereby consistent and uniform or discrete, independent levels of operation are more easily attained.

Further, the invention provides adaptive inflation systems which avoid at least some of the difficulties associated with certain prior art adaptive inflation systems wherein, subsequent to deployment of the associated airbag, the inflator remains active or alive with components included to create a second or different output level of performance.

More specifically, with at least certain of the subject adaptive inflation systems, essentially the entire pressurized gas charge exits the device regardless of the selected performance level and all that remains active or alive is an initiator which may have a relatively small pyrotechnic load. The simple firing of such an initiator, by itself, may not be a concern. Alternatively, the firing logic of the inflation system can simply be designed to assure the post-event firing of this remaining initiator, rendering the initiator inert for subsequent disposal or handling.

It is to be understood that the discussion of theory, such as the discussion of decomposition, for example, is included to assist in the understanding of the subject invention and is in no way limiting to the invention in its broad application.

The invention illustratively disclosed herein suitably may be practiced in the absence of any element, part, step, component, or ingredient which is not specifically disclosed herein.

The foregoing detailed description is given for clearness of understanding only, and no unnecessary limitations are to be understood therefrom, as modifications within the scope of the invention will be obvious to those skilled in the art.

What is claimed is:

1. An apparatus for inflating an inflatable device, said apparatus comprising:
   a first chamber containing nitrous oxide and adapted to provide gaseous inflation material to the inflatable device;
   a heat source actuatable to be in heat transmitting communication with the contents of said first chamber to initiate decomposition of the nitrous oxide;
   at least one exit opening wherethrough gaseous inflation material from said first chamber can be expelled from the apparatus;
   a first sealing means normally preventing flow of gaseous inflation material through said at least one exit opening;
   opening means actuatable to open said first sealing means to permit flow of gaseous inflation material through said at least one exit opening whereby at least a portion of gaseous inflation material from said first chamber can be expelled from the apparatus; and
   directing means for directing the expelled contents of said first chamber to the inflatable device.

2. The apparatus of claim 1 additionally comprising:
   a divider separating said first chamber into a first section adjacent said heat source and a second section adjacent said at least one exit opening said divider restricting fluid communication of chamber contents between the first and second sections.

3. The apparatus of claim 2 wherein said divider includes at least one flow passage therethrough with a second sealing means normally closing said at least one flow passage, said second sealing means openable at preselected operating conditions to permit fluid communication between the first and second sections, through said at least one flow passage.

4. The apparatus of claim 1 wherein said first sealing means are adapted to open when a predetermined increase in pressure within said first chamber is realized.

5. The apparatus of claim 1 additionally comprising a plurality of internal flow throttling orifices and having a flow restricting member selectively restricting flow of material through at least one of said internal flow throttling orifices upon actuation of the apparatus.

6. The apparatus of claim 1 wherein at least a portion of the nitrous oxide stored in said first chamber is in a gaseous form.

7. The apparatus of claim 1 wherein at least a portion of the nitrous oxide stored in said first chamber is in a liquid form.

8. The apparatus of claim 1 wherein said first chamber additionally contains at least one inert gas.

9. The apparatus of claim 8 wherein said first chamber also contains another oxygen-containing gas.

10. The apparatus of claim 1 wherein said first chamber also contains another oxygen-containing gas.

11. The apparatus of claim 1 additionally comprising:
    a charge of gas generant material in fluid communication with the nitrous oxide contained within said first chamber with at least a portion of the gas generant being combustible, and
    an igniter which, when actuated, ignites the combustible gas generant to form hot gaseous inflation products to inflate the device.

12. The apparatus of claim 1 additionally comprising:
    a charge of gas generant material normally stored in a second chamber, said second chamber openable to said first chamber whereby at least a portion of said charge of gas generant material is placed in fluid communication with the contents of said first chamber with at least a portion of the gas generant being combustible, and
    an igniter which, when actuated, ignites the combustible gas generant to form hot gaseous inflation products to inflate the device.

13. The apparatus of claim 12 wherein the gas generant material of said stored charge is under-oxidized.

14. The apparatus of claim 1 wherein said opening means comprises a projectile and means for propelling a projectile to rupture said first sealing means.

15. The apparatus of claim 14 additionally containing a charge of gas generant material, with at least a portion of said charge of gas generant material being combustible to form hot gaseous inflation products in fluid communication with the nitrous oxide contained within said first chamber, and
    an igniter which, when actuated, ignites the combustible gas generant to form the hot gaseous inflation products, wherein
    said projectile further serves to activate said igniter.

16. A method of operating an apparatus for inflating an inflatable device, wherein the apparatus includes a first chamber containing nitrous oxide and is adapted to provide gaseous inflation material to the inflatable device, a heat source actuatable to be in heat transmitting communication with the contents of the first chamber to initiate decomposition of the nitrous oxide, at least one exit opening wherethrough gaseous inflation material from the first chamber can be expelled from the apparatus, first sealing means normally preventing flow of gaseous inflation material through the at least one exit opening, opening means actuatable to open the first sealing means to permit flow of gaseous inflation material through the at least one exit opening whereby at least a portion of gaseous inflation material from the first chamber can be expelled from the apparatus and directing means for directing the expelled contents of the first chamber to the inflatable device, said method comprising the steps of:

actuating the opening means to open the first sealing means to permit flow of gaseous inflation material through the at least one exit opening; and releasing ambient temperature nitrous oxide through the at least one exit opening.

17. The method of claim 16 additionally comprising the steps of:

actuating the heat source whereby heat is transmitted to the contents of the first chamber to increase the temperature thereof; and subsequent to beginning said release of ambient temperature nitrous oxide, releasing at least a portion of heated first chamber contents through the at least one exit opening.

18. A method of operating an apparatus for inflating an inflatable device, wherein the apparatus includes a first chamber containing nitrous oxide and is adapted to provide gaseous inflation material to the inflatable device, a heat source actuatable to be in heat transmitting communication with the contents of the first chamber to initiate decomposition of the nitrous oxide at least one exit opening wherethrough gaseous inflation material from the first chamber can be expelled from the apparatus, first sealing means normally preventing flow of gaseous inflation material through the at least one exit opening, the first sealing means adapted to open when a predetermined increase in pressure within the first chamber is realized opening means actuatable to open the first sealing means to permit flow of gaseous inflation material through the at least one exit opening whereby at least a portion of gaseous inflation material from the first chamber can be expelled from the apparatus and directing means for directing the expelled contents of the first chamber to the inflatable device, said method comprising the steps of:

actuating the heat source whereby heat is transmitted to the contents of the first chamber to increase the temperature and pressure with the first chamber;

opening the first chamber sealing means when a predetermined increase in pressure within the first chamber is realized; and releasing heated first chamber contents from the apparatus.

19. A method of operating an apparatus for inflating an inflatable device wherein the apparatus includes a first chamber containing nitrous oxide and is adapted to provide gaseous inflation material to the inflatable device, a heat source actuatable to be in heat transmitting communication with the contents of the first chamber to initiate decomposition of the nitrous oxide, at least one exit opening wherethrough gaseous inflation material from the first chamber can be expelled from the apparatus, first sealing means normally preventing flow of gaseous inflation material through the at least one exit opening, opening means actuatable to open the first sealing means to permit flow of gaseous inflation material through the at least one exit opening whereby at least a portion of gaseous inflation material from the first chamber can be expelled from the apparatus, directing means for directing the expelled contents of the first chamber to the inflatable device, a charge of gas generant material in fluid communication with the nitrous oxide contained within the first chamber with at least a portion of the gas generant being combustible, and an igniter which, when actuated, ignites the combustible gas generant to form hot gaseous inflation products to inflate the device, said method comprising the step of:

igniting the combustible gas generant to form hot gaseous inflation products.

20. A method of operating an apparatus for inflating an inflatable device wherein the apparatus includes a first chamber containing nitrous oxide and is adapted to provide gaseous inflation material to the inflatable device, a heat source actuatable to be in heat transmitting communication with the contents of the first chamber to initiate decomposition of the nitrous oxide, at least one exit opening wherethrough gaseous inflation material from the first chamber can be expelled from the apparatus, first sealing means normally preventing flow of gaseous inflation material through the at least one exit opening, opening means actuatable to open the first sealing means to permit flow of gaseous inflation material through the at least one exit opening whereby at least a portion of gaseous inflation material from the first chamber can be expelled from the apparatus directing means for directing the expelled contents of the first chamber to the inflatable device and a divider separating the first chamber into a first section adjacent the heat source and a second section adjacent the at least one exit opening the divider restricting fluid communication of chamber contents between the first and second sections and including at least one flow passage therethrough with a second sealing means normally closing the at least one flow passage, the second sealing means openable at preselected operating conditions to permit fluid communication between the first and second sections through the at least one flow passage, said method comprising the steps of:

opening the first chamber to release ambient temperature nitrous oxide from the apparatus, actuating the heat source whereby heat is transmitted to the contents of the first section of the first chamber to increase the temperature and pressure therein, subsequent to said opening of the first chamber, opening the at least one flow passage to permit fluid communication between the first and second sections.

21. The method of claim 12 wherein the charge of gas generant material is under-oxidized and normally stored in a second chamber openable to the first chamber whereby at least a portion of said charge of gas generant material is placed in fluid communication with the contents of the first chamber.

22. An adaptive output inflator apparatus for inflating an inflatable device, said apparatus comprising:

a first chamber containing nitrous oxide and adapted to provide gaseous inflation material to the inflatable device;

a heat source actuatable to be in heat transmitting communication with said first chamber to initiate decomposition of the nitrous oxide;

at least one exit opening wherethrough gaseous inflation material from said first chamber can be expelled from the apparatus;

first sealing means normally preventing flow of gaseous inflation material through said at least one exit opening;

opening means actuatable to open said first sealing means to permit flow of gaseous inflation material through said at least one exit opening whereby at least a portion of gaseous inflation material from said first chamber can be expelled from the apparatus;

a second chamber in which is stored a charge of gas generant material, said second chamber openable to said first chamber whereby at least a portion of the charge of gas generant material is placed in fluid communication with the contents of said first chamber with at least a portion of the gas generant being combustible;

an igniter which, when actuated, ignites the combustible gas generant to form hot gaseous inflation products to inflate the device; and directing means for directing the expelled contents of said first chamber to the inflatable device.

23. The apparatus of claim 22 wherein said first chamber additionally contains at least one inert gas.

24. The apparatus of claim 23 wherein said first chamber also contains another oxygen-containing gas.

25. The apparatus of claim 22 wherein said first chamber also contains another oxygen-containing gas.

26. The apparatus of claim 22 wherein the gas generant material of said stored charge is under-oxidized.

27. In an apparatus that forms an inflation material for inflating an inflatable device the improvement comprising a plurality of internal flow throttling orifices with a pressure sensitive flow restricting member initially, upon actuation of the apparatus, partially restricting flow through at least one of said internal flow throttling orifices, wherein with application of a predetermined pressure thereagainst said flow restricting member selectively permits a greater relative flow through the internal flow throttling orifice.

28. In an apparatus that forms an inflation material for inflating an inflatable device the improvement comprising a plurality of internal flow throttling orifices with a pressure sensitive flow restricting member initially, upon actuation of the apparatus, totally restricting flow through less than all of said internal flow throttling orifices, wherein with application of a predetermined pressure thereagainst said flow restricting member selectively opens to permit flow through the internal flow throttling orifice previously totally flow restricted.

* * * * *